US011235626B2

United States Patent
Tokizaki

(10) Patent No.: US 11,235,626 B2
(45) Date of Patent: Feb. 1, 2022

(54) PNEUMATIC TIRE

(71) Applicant: The Yokohama Rubber Co., LTD., Tokyo (JP)

(72) Inventor: Hiroshi Tokizaki, Tokyo (JP)

(73) Assignee: The Yokohama Rubber Co., LTD.

(*) Notice: Subject to any disclaimer, the term of this patent is extended or adjusted under 35 U.S.C. 154(b) by 894 days.

(21) Appl. No.: 15/569,077

(22) PCT Filed: Feb. 8, 2016

(86) PCT No.: PCT/JP2016/053696
§ 371 (c)(1),
(2) Date: Oct. 24, 2017

(87) PCT Pub. No.: WO2016/208212
PCT Pub. Date: Dec. 29, 2016

(65) Prior Publication Data
US 2018/0141391 A1    May 24, 2018

(30) Foreign Application Priority Data
Jun. 22, 2015  (JP) .............................. JP2015-125110

(51) Int. Cl.
*B60C 13/02* (2006.01)
(52) U.S. Cl.
CPC .................................. *B60C 13/02* (2013.01)
(58) Field of Classification Search
CPC ...... B60C 13/001; B60C 13/002; B60C 13/02
(Continued)

(56) References Cited

U.S. PATENT DOCUMENTS 5,807,446 A * 9/1998 Ratliff, Jr. ............... B60C 13/02
                                                                152/523
D475,345 S * 6/2003 Endo ........................... D12/605
(Continued)

FOREIGN PATENT DOCUMENTS

JP    S54-107004    8/1979
JP    H09-323513   12/1997
(Continued)

OTHER PUBLICATIONS

Machine Translation: JP-2001191745-A,Kajikawa, Hidechika, (Year: 2020).*
(Continued)

*Primary Examiner* — Kendra Ly
(74) *Attorney, Agent, or Firm* — Thorpe North & Western

(57) ABSTRACT

A pneumatic tire includes a tread portion including grooves formed into a predetermined pattern design, a sidewall portion including a surface on which a maximum tire width position is located, and a serration portion including a plurality of ridges arranged at intervals in a tire circumferential direction on the surface of the sidewall portion. The serration portion includes first ridge groups and second ridge groups. The first ridge groups each include a plurality of first ridges arranged adjacent to each other in the tire circumferential direction and including end portions of which the distances from the rotation axis gradually change. The second ridge groups each include a plurality of second ridges arranged adjacent to each other in the tire circumferential direction and including end portions of which the distances from the rotation axis gradually change.

17 Claims, 17 Drawing Sheets

(58) Field of Classification Search
USPC .......................................................... D12/605
See application file for complete search history.

(56) References Cited

U.S. PATENT DOCUMENTS

| | | | | |
|---|---|---|---|---|
| 6,983,781 B2* | 1/2006 | Ebiko | ................... | B60C 13/001 |
| | | | | 152/523 |
| D554,577 S | 11/2007 | Miyazaki | | |
| D667,782 S | 9/2012 | Mukai | | |
| 2013/0000808 A1 | 1/2013 | Ishida | | |
| 2015/0041037 A1* | 2/2015 | Mukai | ..................... | B60C 13/02 |
| | | | | 152/523 |

FOREIGN PATENT DOCUMENTS

| | | | | |
|---|---|---|---|---|
| JP | 11291722 | A | * | 10/1999 |
| JP | 2001-191745 | | | 7/2001 |
| JP | 2001191745 | A | * | 7/2001 |
| JP | 1154504 | | | 9/2002 |
| JP | 1154505 | | | 9/2002 |
| JP | 4947225 | | | 6/2012 |
| JP | 1487514 | | | 1/2014 |

OTHER PUBLICATIONS

Machine Translation: JP-11291722-A, Itabashi, Shinobu, (Year: 2020).*
International Search Report for International Application No. PCT/JP2016/053696 dated May 10, 2016, 6 pages, Japan.

* cited by examiner

| | COMPARATIVE EXAMPLE 1 | COMPARATIVE EXAMPLE 2 | EXAMPLE 1 | EXAMPLE 2 | EXAMPLE 3 | EXAMPLE 4 |
|---|---|---|---|---|---|---|
| DURABILITY | 100 | 100 | 105 | 105 | 110 | 110 |
| APPEARANCE | 100 | 100 | 105 | 105 | 110 | 110 |
| BRAND VISIBILITY | 100 | 100 | 105 | 105 | 110 | 110 |

PNEUMATIC TIRE

TECHNICAL FIELD

The present technology relates to a pneumatic tire.

BACKGROUND ART

A pneumatic tire having a serration, disclosed in Japanese Patent No. 4947225, is known in the art relating to pneumatic tires. The serration is disposed on a sidewall portion of the pneumatic tire for improvement in appearance of the pneumatic tire and the like. The serration includes a plurality of ridges arranged at intervals.

The sidewall portion of a pneumatic tire fitted to a vehicle deflects and deforms due to a load. Thus, if the pneumatic tire is fitted to a vehicle for a long time, travels over a long distance, or has a low air pressure, a crack may be generated on its sidewall portion. Growth of the generated crack decreases durability of the pneumatic tire.

SUMMARY

It is expected that enhancement of the serration can prevent generation of cracks, poor appearance by making generated cracks inconspicuous, and growth of generated cracks.

An aspect of the present technology provides a pneumatic tire capable of preventing a decrease in quality due to cracks.

An aspect of the present technology provides a pneumatic tire rotatable about a rotation axis upon the pneumatic tire being mounted on a rim. The pneumatic tire includes: a tread portion including grooves formed into a predetermined pattern design; a sidewall portion adjacent to a boundary portion of the tread portion in a tire lateral direction and including a surface on which a maximum tire width position is located; and a serration portion including a plurality of ridges shaped into lines in a plane orthogonal to the rotation axis, the plurality of ridges each including an end portion, and the plurality of ridges being arranged at intervals in a tire circumferential direction on the surface of the sidewall portion. The serration portion includes first ridge groups and second ridge groups, the first ridge groups each including a plurality of first ridges arranged adjacent to each other in the tire circumferential direction, the plurality of first ridges including the end portions of which distances from the rotation axis gradually change, the second ridge groups each including a plurality of second ridges arranged adjacent to each other in the tire circumferential direction, and the plurality of second ridges including the end portions of which distances from the rotation axis gradually change. The first ridge groups and the second ridge groups are adjacent to each other in the tire circumferential direction. The end portion of a first ridge of the plurality of first ridges located farthest on a first side in the tire circumferential direction in each of the first ridge groups is located on one of an inside and an outside of the maximum tire width position in a tire radial direction, and the end portion of a first ridge of the plurality of first ridges located farthest on a second side in the tire circumferential direction is located on the other of the inside and the outside of the maximum tire width position in the tire radial direction. The end portion of a second ridge of the plurality of second ridges located farthest on the first side in the tire circumferential direction in each of the second ridge groups is located on one of the inside and the outside of the maximum tire width position in the tire radial direction, and the end portion of a second ridge of the plurality of second ridges located farthest on the second side in the tire circumferential direction is located on the other of the inside and the outside of the maximum tire width position in the tire radial direction.

According to the present technology, the serration portion including the line-shaped ridges is disposed on the sidewall portion and thus reinforces the sidewall portion. This configuration prevents generation of cracks on the sidewall portion. The end portions in the first ridge groups are arranged in the tire circumferential direction so that the distances from the rotation axis gradually change from one of the inside and the outside of the maximum tire width position toward the other. The end portions in the second ridge groups are arranged in the tire circumferential direction so that the distances from the rotation axis gradually change from one of the inside and the outside of the maximum tire width position toward the other. Since the ridges are arranged from one of the inside and the outside of the maximum tire width position toward the other, aesthetics of the pneumatic tire is improved. The rubber of the sidewall portion in the maximum tire width position is thin, and a portion where the maximum tire width position is located in the sidewall portion deflects and deforms significantly. Thus, cracks are highly likely to be generated. Since the surface of the sidewall portion including the maximum tire width position is covered with the ridges, generation of cracks on the sidewall portion is prevented. Even if a crack is generated on the sidewall portion, the ridges make the crack inconspicuous, resulting in prevention of poor appearance. Even if the internal structure of the pneumatic tire, such as a folded back portion of a carcass, causes irregularities to be formed on the surface of the sidewall portion, the irregularities are camouflaged with the ridges, resulting in prevention of poor appearance. If the end portions of the ridges are concentrated in the maximum tire width position, a crack generated in the maximum tire width position is highly likely to grow along the end portions located in the maximum tire width position. The first ridges are arranged on the surface of the sidewall portion so that first imaginary lines connecting the end portions in the first ridge groups incline from one of the inside and the outside of the maximum tire width position toward the other, and the second ridges are arranged on the surface of the sidewall portion so that second imaginary lines connecting the end portions in the second ridge groups incline from one of the inside and the outside of the maximum tire width position toward the other. This configuration prevents the end portions from being concentrated in the maximum tire width position. Since the ridges are arranged at intervals, the end portions are separated from each other. Even if a crack is generated in the maximum tire width position, the separated end portions prevent propagation and growth of the crack. Poor appearance and growth of cracks are prevented, resulting in prevention of a decrease in quality of the pneumatic tire due to cracks.

Note that "end portions" refer to ends of the ridges capable of forming an imaginary line that connects the end portions and has one end located on one of the inside and the outside of the maximum tire width position in the tire radial direction and the other end located on the other of the inside and the outside of the maximum tire width position in the tire radial direction. The ends, on the first side in the tire circumferential direction, of the first imaginary lines connecting the end portions in the first ridge groups are located on one of the inside and the outside of the maximum tire width position in the tire radial direction, and the ends, on the second side in the tire circumferential direction, of the first imaginary lines are located on the other of the inside and the outside of the maximum tire width position in the tire radial direction. The ends, on the first side in the tire circumferential direction, of the second imaginary lines connecting the end portions in the second ridge groups are located on one of the inside and the outside of the maximum tire width position in the tire radial direction, and the ends, on the second side in the tire circumferential direction, of the second imaginary lines are located on the other of the inside and the outside of the maximum tire width position in the tire radial direction. The first imaginary lines and the second imaginary lines extend in mutually different directions and form an angle.

According to an aspect of the present technology, a plurality of ridge groups each composed of a first ridge group of the first ridge groups and a second ridge group of the second ridge groups are preferably disposed adjacent to each other in the tire circumferential direction.

The ridge groups composed of the first ridge groups and the second ridge groups are disposed adjacent to each other in the tire circumferential direction, so that the first imaginary lines connecting the end portions in the first ridge groups and the second imaginary lines connecting the end portions in the second ridge groups form a zigzag imaginary line in the tire circumferential direction. The end portions arranged in a zigzag manner in the tire circumferential direction prevent stress concentration in the sidewall portion and prevent generation and growth of cracks. The end portions arranged in a zigzag manner improve aesthetics of the pneumatic tire.

According to an aspect of the present technology, an angle between a first radial line connecting the rotation axis and the end portion located farthest on the first side in the tire circumferential direction in each of the ridge groups and a second radial line connecting the rotation axis and the end portion located farthest on the second side in the tire circumferential direction is preferably 3° or greater and 30° or less.

An angle of 3° or greater and 30° or less between the first radial line and the second radial line determines a suitable size and number of the first imaginary lines connecting the end portions in the first ridge groups and the second imaginary lines connecting the end portions in the second ridge groups. Thus, generation and growth of cracks can be prevented, and aesthetics can be improved.

According to an aspect of the present technology, the plurality of ridges are preferably disposed between the boundary portion and a rim check line for checking a state of mounting the pneumatic tire on the rim, on the surface of the sidewall portion; and a distance, in the tire radial direction, between the end portion located innermost and the end portion located outermost in the tire radial direction is preferably 5% or greater and 40% or less of a distance between the boundary portion and the rim check line in the tire radial direction.

The distance, in the tire radial direction, between the end portion located innermost and the end portion located outermost in the tire radial direction indicates amplitude of the end portions arranged in a zigzag manner (zigzag width). The boundary portion between the tread portion including the grooves formed into the predetermined pattern design and the sidewall portion indicates a pattern end (design end) of the tread portion. If the zigzag width is less than 5% of the distance between the boundary portion and the rim check line in the tire radial direction, the end portions are concentrated in the maximum tire width position. This may cause insufficient prevention of generation and growth of cracks. If the zigzag width is greater than 40% of the distance between the boundary portion and the rim check line in the tire radial direction, aesthetics may be impaired. A zigzag width of 5% or greater and 40% or less of the distance between the boundary portion and the rim check line in the tire radial direction can improve aesthetics and prevent generation and growth of cracks.

According to an aspect of the present technology, an angle between a first imaginary line connecting the end portions in each of the first ridge groups and a second imaginary line connecting the end portions in each of the second ridge groups is preferably less than 90°.

An acute angle between the first imaginary line and the second imaginary line enables consumers to sense visual aesthetics.

According to an aspect of the present technology, preferably, the first imaginary line is longer than the second imaginary line and is at least partially curved.

The first imaginary line longer than the second imaginary line improves aesthetics. Since the end portions are arranged at intervals so that the first imaginary line is at least partially curved, propagation and growth of cracks are prevented.

According to an aspect of the present technology, the plurality of ridges may include inner end portions and outer end portions located outside the inner end portions in the tire radial direction; the end portions of the plurality of ridges may be the inner end portions; and the outer end portions of the plurality of ridges may be located outside the maximum tire width position in the tire radial direction.

This configuration allows the serration portion to be located mainly outside the maximum tire width position in the tire radial direction. Thus, aesthetics is improved, and generation and growth of cracks are prevented.

According to an aspect of the present technology, the plurality of ridges may include inner end portions and outer end portions located outside the inner end portions in the tire radial direction; and the serration portion may include a first serration portion including the inner end portions being the end portions of the plurality of ridges and a second serration portion at least partially disposed inside the first serration portion in the tire radial direction and including a plurality of ridges including end portions facing the end portions of the plurality of ridges of the first serration portion.

This configuration provides both the first serration portion disposed mainly outside the maximum tire width position in the tire radial direction and the second serration portion disposed mainly inside the maximum tire width position in the tire radial direction. Since the end portions of the ridges of the first serration portion face the end portions of the ridges of the second serration portion, the surface of the sidewall portion is covered with the ridges. This configuration prevents generation and growth of cracks. The surface of the sidewall portion including the maximum tire width position is covered with the ridges, so that irregularities due to a generated crack or the internal structure of the pneumatic tire are camouflaged.

According to an aspect of the present technology, an angle between a first imaginary line connecting a plurality of the end portions in each of the first ridge groups of the first serration portion and a second imaginary line connecting a plurality of the end portions in each of the second ridge groups of the first serration portion may be greater than 90°; the plurality of ridges of the first serration portion each may incline with respect to a radial line from the rotation axis so that the inner end portions are located on the first side of the outer end portions in the tire circumferential direction; the plurality of ridges of the second serration portion each may incline with respect to a radial line from the rotation axis so that the outer end portions are located on the first side of the inner end portions in the tire circumferential direction; the first ridge groups of the first serration portion each may include a plurality of first ridges arranged adjacent to each other in the tire circumferential direction and including the inner end portions of which distances from the rotation axis gradually increase; the second ridge groups of the first serration portion each may include a plurality of second ridges arranged adjacent to each other in the tire circumferential direction and including the inner end portions of which distances from the rotation axis gradually decrease; the first ridge groups of the second serration portion each may include a plurality of first ridges arranged adjacent to each other in the tire circumferential direction and including the outer end portions of which distances from the rotation axis gradually increase; the second ridge groups of the second serration portion each may include a plurality of second ridges arranged adjacent to each other in the tire circumferential direction and including the outer end portions of which distances from the rotation axis gradually decrease; the end portions of the first serration portion may be the inner end portions; the end portions of the second serration portion may be the outer end portions; the inner end portions in the first ridge groups of the first serration portion may face the outer end portions in the first ridge groups of the second serration portion; and the inner end portions in the second ridge groups of the first serration portion may face the outer end portions in the second ridge groups of the second serration portion.

The ridges of the first serration portion each incline with respect to a radial line from the rotation axis so that the inner end portion is located on the first side of the outer end portion in the tire circumferential direction, and the ridges of the second serration portion each incline with respect to a radial line from the rotation axis so that the outer end portion is located on the first side of the inner end portion in the tire circumferential direction. This configuration improves aesthetics. The light reflection direction of the first serration portion and the light reflection direction of the second serration portion are mutually different, enabling consumers to sense visual aesthetics. The inner end portions in the first ridge groups of the first serration portion face the outer end portions in the first ridge groups of the second serration portion, and the first imaginary lines connecting the end portions in the first ridge groups of the first serration portion and third imaginary lines connecting the end portions in the first ridge groups of the second serration portion are close to and substantially parallel with each other. Similarly, the inner end portions in the second ridge groups of the first serration portion face the outer end portions in the second ridge groups of the second serration portion, and the second imaginary lines connecting the end portions in the second ridge groups of the first serration portion and fourth imaginary lines connecting the end portions in the second ridge groups of the second serration portion are close to and substantially parallel with each other. This configuration allows the surface of the sidewall portion to be covered with the ridges, resulting in prevention of poor appearance, generation of cracks, and growth of cracks.

According to an aspect of the present technology, an angle between a first imaginary line connecting the end portions in each of the first ridge groups of the first serration portion and a second imaginary line connecting the end portions in each of the second ridge groups of the first serration portion may be less than 90°; the plurality of ridges of the first serration portion each may incline with respect to a radial line from the rotation axis so that the inner end portions are located on the first side of the outer end portions in the tire circumferential direction; the plurality of ridges of the second serration portion each may incline with respect to a radial line from the rotation axis so that the outer end portions are located on the first side of the inner end portions in the tire circumferential direction; the first ridge groups of the first serration portion each may include a plurality of first ridges arranged adjacent to each other in the tire circumferential direction and including the inner end portions of which distances from the rotation axis gradually increase; the second ridge groups of the first serration portion each may include a plurality of second ridges arranged adjacent to each other in the tire circumferential direction and including the inner end portions of which distances from the rotation axis gradually increase; the first ridge groups of the second serration portion each may include a plurality of first ridges arranged adjacent to each other in the tire circumferential direction and including the outer end portions of which distances from the rotation axis gradually increase; the second ridge groups of the second serration portion each may include a plurality of second ridges arranged adjacent to each other in the tire circumferential direction between the first imaginary line and the second imaginary line and including the inner end portions of which distances from the rotation axis gradually increase; the end portions of the first serration portion may be the inner end portions; the end portions of the first ridges of the second serration portion may be the outer end portions; the end portions of the second ridges of the second serration portion may be the inner end portions; the inner end portions in the first ridge groups of the first serration portion may face the outer end portions in the first ridge groups of the second serration portion; and the inner end portions in the second ridge groups of the first serration portion may face the inner end portions in the second ridge groups of the second serration portion.

The first imaginary line and the second imaginary line form an acute angle, the ridges of the first serration portion each incline with respect to a radial line from the rotation axis so that the inner end portion is located on the first side of the outer end portion in the tire circumferential direction, and the ridges of the second serration portion each incline with respect to a radial line from the rotation axis so that the outer end portion is located on the first side of the inner end portion in the tire circumferential direction. This configuration improves aesthetics. The light reflection direction of the first serration portion and the light reflection direction of the second serration portion are mutually different, enabling consumers to sense visual aesthetics. The inner end portions in the first ridge groups of the first serration portion face the outer end portions in the first ridge groups of the second serration portion, and the first imaginary lines connecting the end portions in the first ridge groups of the first serration portion and third imaginary lines connecting the end portions in the first ridge groups of the second serration portion are close to and substantially parallel with each other. The inner end portions in the second ridge groups of the first serration portion face the inner end portions in the second ridge groups of the second serration portion, and the second imaginary lines connecting the end portions in the second ridge groups of the first serration portion and fourth imaginary lines connecting the end portions in the second ridge groups of the second serration portion are close to and substantially parallel with each other. This configuration allows the surface of the sidewall portion to be covered with the ridges, resulting in prevention of poor appearance, generation of cracks, and growth of cracks. The second ridge groups of the second serration portion are disposed between the first imaginary lines and the second imaginary lines that form an acute angle. The short ridges of the second ridge groups are disposed between the first imaginary lines and the second imaginary lines that form an acute angle, so that gas accumulation is prevented between the first imaginary lines and the second imaginary lines in a vulcanization step using a mold in manufacturing the pneumatic tire. Gas is smoothly discharged during vulcanization, resulting in manufacture of a high quality pneumatic tire.

According to an aspect of the present technology, the plurality of ridges of the first serration portion may be in contact with the plurality of ridges of the second serration portion.

Since the ridges of the first serration portion and the ridges of the second serration portion are provided as different members instead of single members, stress concentration is prevented at the boundary between the ridges of the first serration portion and the ridges of the second serration portion, resulting in prevention of generation of cracks. Since the ridges of the first serration portion and the ridges of the second serration portion are different members, propagation of cracks is prevented. The ridges of the first serration portion are in contact with the ridges of the second serration portion, so that the surface of the sidewall portion is sufficiently covered with the ridges of the first serration portion and the ridges of the second serration portion. Thus, irregularities due to a generated crack or the internal structure of the pneumatic tire are camouflaged.

According to an aspect of the present technology, the ridges of the first serration portion may be separated from the ridges of the second serration portion.

The ridges of the first serration portion and the ridges of the second serration portion, which are different members, are arranged separately. This configuration prevents stress concentration at the boundary between the ridges of the first serration portion and the ridges of the second serration portion and prevents generation of cracks. Since the ridges of the first serration portion and the ridges of the second serration portion are separated from each other, propagation of cracks is prevented. Irregularities due to a generated crack or the internal structure of the pneumatic tire are camouflaged with the ridges of the first serration portion and the ridges of the second serration portion.

An aspect of the present technology provides a pneumatic tire capable of preventing a decrease in quality due to cracks.

DETAILED DESCRIPTION

Embodiments according to the present technology will be described with reference to the drawings. However, the present technology is not limited to those embodiments. The constituents of the embodiments described below can be combined with one another as appropriate. In addition, some of the constituents may not be used in some embodiments.

First Embodiment

Overview of Tire

Figure 1:
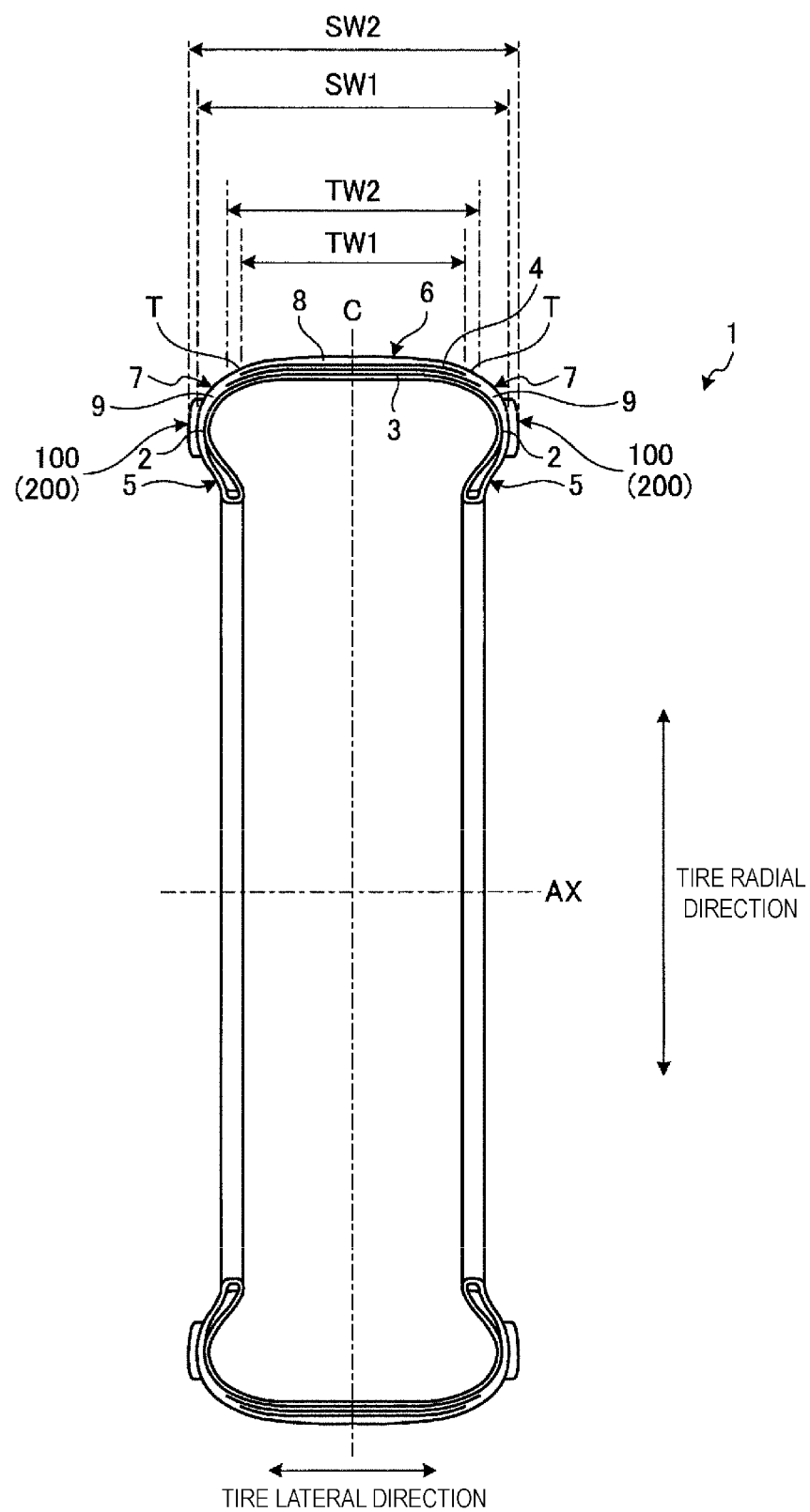
FIG. 1 is a diagram schematically illustrating an example of a tire according to a first embodiment.
Figure 2:
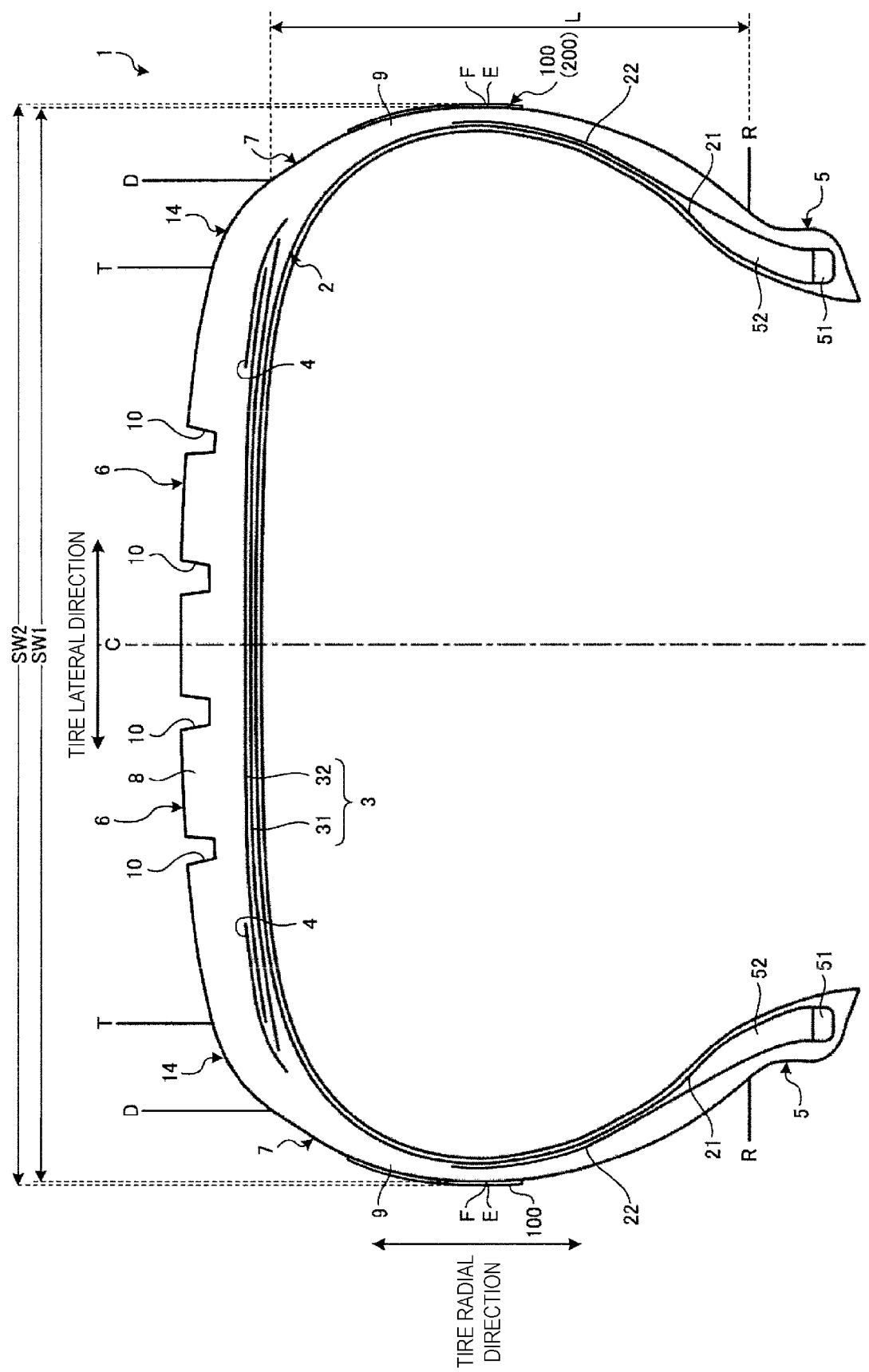
FIG. 2 is a diagram schematically illustrating a portion of the tire according to the first embodiment.
Figure 3:
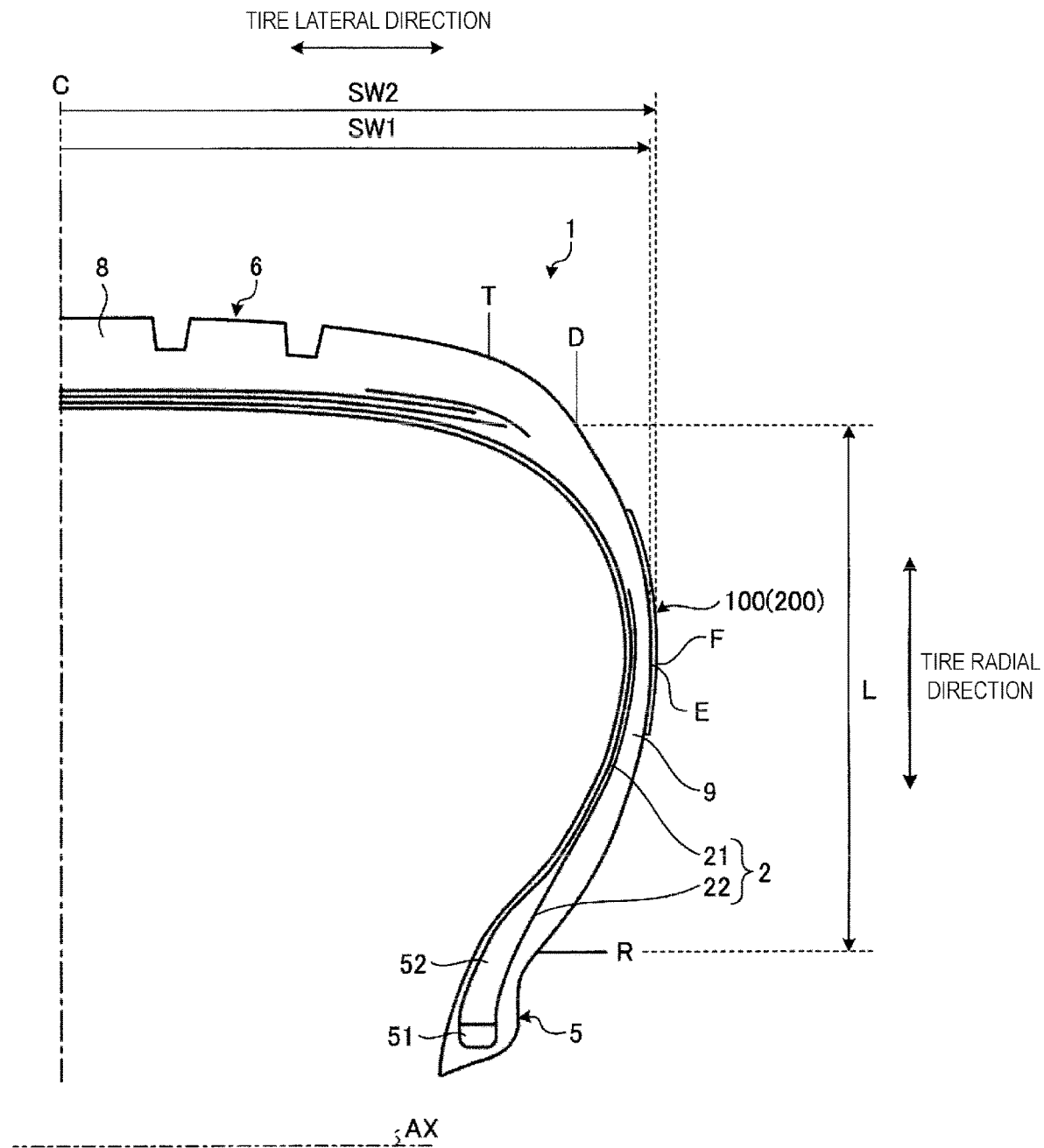
FIG. 3 is a partially enlarged view of FIG. 2.

A first embodiment will now be described. FIG. 1 is a cross-sectional view illustrating an example of a tire 1 according to the present embodiment. FIG. 2 is a cross-sectional view illustrating a portion of the tire 1 according to the present embodiment. FIG. 3 is a partially enlarged view of FIG. 2. The tire 1 is a pneumatic tire. The tire 1 is rotatable about a rotation axis AX when mounted on a rim. FIGS. 1, 2, and 3 illustrate the tire 1 in a meridian cross-section through which the rotation axis AX passes. The rotation axis AX of the tire 1 is orthogonal to a tire equatorial plane C. "Tire equatorial plane C" refers to the center of the tire 1 in the tire lateral direction.

Herein, "tire lateral direction" refers to the direction parallel with the rotation axis AX, "tire radial direction" refers to the radiation direction with respect to the rotation axis AX, and "tire circumferential direction" refers to the direction in which the tire 1 rotates about the rotation axis AX, as appropriate. In addition, herein, "tire center C" refers to the tire equatorial plane C as appropriate.

In the present embodiment, "outside in the tire lateral direction" refers to the side remote or away from the tire center C in the tire lateral direction. "Inside in the tire lateral direction" refers to the side near or closer to the tire center C in the tire lateral direction. "Outside in the tire radial direction" refers to the side remote or away from the rotation axis AX in the tire radial direction. "Inside in the tire radial direction" refers to the side near or closer to the rotation axis AX in the tire radial direction. "First side in the tire circumferential direction" refers to a specified side in the tire circumferential direction. "Second side in the tire circumferential direction" refers to the side opposite to the specified side in the tire circumferential direction.

The tire 1 includes a carcass 2, a belt layer 3, a belt cover 4, bead portions 5, a tread portion 6, sidewall portions 7, and serration portions 100 disposed on the sidewall portions 7.

The tread portion 6 includes a tread rubber 8. The sidewall portions 7 include side rubbers 9. The serration portions 100 are formed by rubber.

The tire 1 has a tread contact width TW1 indicating the ground contact width of the tread portion 6. "Tread contact width TW1" refers to the maximum value of the ground contact width in the tire lateral direction measured when the tire 1 is mounted on a regular rim, inflated to a regular internal pressure, and placed vertically upon a flat surface with a regular load applied. In other words, "tread contact width TW1" refers to the distance between a ground contact edge T of the tread portion 6 on one side of the tire center C in the tire lateral direction and a ground contact edge T of the tread portion 6 on the other side. "Ground contact edges T of the tread portion 6" refer to the edges of a section, contacting the ground, of the tread portion 6 in the tire lateral direction when the tire 1 is mounted on a regular rim, inflated to a regular internal pressure, and placed vertically upon a flat surface with a regular load applied.

The tire 1 has a developed tread width TW2 indicating a development width of the tread portion 6. "Developed tread width TW2" refers to the linear distance between both ends of the tread portion 6 of the tire 1 in a developed view, measured when the tire 1 is mounted on a regular rim, inflated to a regular internal pressure, and applied with no load.

The tire 1 has a tire cross-sectional width SW1 indicating a cross-sectional width of the tire 1. "Tire cross-sectional width SW1" refers to the maximum dimension of the tire 1 in the tire lateral direction with structures that project from the surfaces of the sidewall portions 7 excluded, the maximum dimension being measured when the tire 1 is mounted on a regular rim, inflated to a regular internal pressure, and applied with no load. In the present embodiment, the serration portions 100 are the structures projecting from the surfaces of the sidewall portions 7. "Tire cross-sectional width SW1" refers to the distance between a maximum tire width position E indicating the outermost point of the sidewall portion 7 arranged on one side of the tire center C in the tire lateral direction and a maximum tire width position E indicating the outermost point of the sidewall portion 7 arranged on the other side, with the serration portions 100 excluded.

Note that examples of the structures projecting from the surfaces of the sidewall portions 7 include alphanumerics, marks, and patterns formed by the side rubbers 9. A rim protection bar protecting a rim may be provided to the tire 1. The rim protection bar is arranged in the tire circumferential direction and projects outward in the tire lateral direction. In the tire 1 provided with the rim protection bar, the rim protection bar has the outermost point in the tire lateral direction. In this case, "tire cross-sectional width SW1" refers to the dimension excluding the rim protection bar.

The tire 1 has a total tire width SW2 indicating the total width of the tire 1. "Total tire width SW2" refers to the maximum dimension of the tire 1 in the tire lateral direction measured when the tire 1 is mounted on a regular rim, inflated to a regular internal pressure, and applied with no load. In other words, "total tire width SW2" refers to the distance between the outermost point of the structure composing the tire 1 and arranged on one side of the tire center C in the tire lateral direction and the outermost point of the structure composing the tire 1 and arranged on the other side. In the present embodiment, the serration portions 100 are provided projecting from the surfaces of the sidewall portions 7. If the serration portions 100 are the outermost structures in the tire lateral direction, "total tire width SW2" refers to the distance between a maximum width position F of the serration portion arranged on one side of the tire center C in the tire lateral direction and a maximum width position F of the serration portion arranged on the other side, the maximum width positions F indicating the outermost points of the respective serration portions 100. Note that the outermost structures in the tire lateral direction may be alphanumerics, marks, or the like, instead of the serration portions 100.

"Regular rim" is a rim defined by a standard for each tire 1 according to a system of standards that includes standards on which tires 1 are based, and refers to a "standard rim" in the case of Japan Automobile Tyre Manufacturers Association (JATMA), to a "Design Rim" in the case of Tire and Rim Association (TRA), and to a "Measuring Rim" in the case of European Tyre and Rim Technical Organisation (ETRTO). However, when the tire 1 is an original equipment tire, the genuine wheel on which the tire 1 is mounted is used.

"Regular internal pressure" is an air pressure defined by a standard for each tire 1 according to a system of standards that includes standards on which tires 1 are based, and refers to a "maximum air pressure" in the case of JATMA, to the maximum value in the table of "TIRE ROAD LIMITS AT VARIOUS COLD INFLATION PRESSURES" in the case of TRA, and to "INFLATION PRESSURE" in the case of ETRTO. However, when the tire 1 is an original equipment tire, the air pressure displayed on the vehicle is applied.

"Regular load" is a load defined by a standard for each tire 1 according to a system of standards that includes standards on which tires 1 are based, and refers to a "maximum load capacity" in the case of JATMA, to the maximum value in the table of "TIRE ROAD LIMITS AT VARIOUS COLD INFLATION PRESSURES" in the case of TRA, and to "LOAD CAPACITY" in the case of ETRTO. However, when the tire 1 is mounted on a passenger vehicle, "regular load" corresponds to 88% of the above-described loads. In the case of the tire 1 being an original equipment tire, the wheel load is obtained by dividing the front and rear axle loads stated in the vehicle inspection certificate of the vehicle by the number of tires.

The carcass 2 is a reinforcing member that forms the framework of the tire 1. The carcass 2 includes carcass cords and functions as a pressure vessel when the tire 1 is filled with air. The carcass 2 includes carcass cords made of organic fibers and rubber that covers the carcass cords. Note that the carcass 2 may include carcass cords made of polyester, carcass cords made of nylon, carcass cords made of aramid, and carcass cords made of rayon.

The bead portions 5 are reinforcing members that support the carcass 2. The bead portions 5 are disposed on both sides of the carcass 2 in the tire lateral direction and support both end portions of the carcass 2. The carcass 2 is folded back at bead cores 51 of the bead portions 5. The bead portions 5 fix the tire 1 to a rim. The bead portions 5 each include the bead core 51 and a bead filler 52.

The carcass 2 includes a carcass main portion 21 and carcass folded back portions 22 formed by being folded back at the bead cores 51. The carcass folded back portions 22 are disposed outside the carcass main portion 21 in the tire lateral direction by folding back the carcass 2 at the bead cores 51. The bead cores 51 are members formed by winding bead wires in a ring shape. The bead wires are steel wires. The bead fillers 52 are rubber materials disposed in space defined between the carcass main portion 21 and the respective carcass folded back portions 22 by folding back the carcass 2 at the bead cores 51.

The belt layer 3 is a reinforcing member that holds the form of the tire 1. The belt layer 3 includes belt cords and is disposed between the carcass 2 and the tread rubber 8. The belt layer 3 includes belt cords made of metal fibers and rubber that covers the belt cords. Note that the belt layer 3 may include belt cords made of organic fibers. The belt layer 3 includes a first belt ply 31 and a second belt ply 32. The first belt ply 31 and the second belt ply 32 are layered so that the belt cord of the first belt ply 31 and the belt cord of the second belt ply 32 intersect each other.

The belt cover 4 is a reinforcing member that protects and reinforces the belt layer 3. The belt cover 4 includes cover cords and is disposed outside the belt layer 3 with respect to the rotation axis AX of the tire 1. The belt cover 4 includes cover cords made of metal fibers and rubber that covers the cover cords. Note that the belt cover 4 may include cover cords made of organic fibers.

Figure 4:
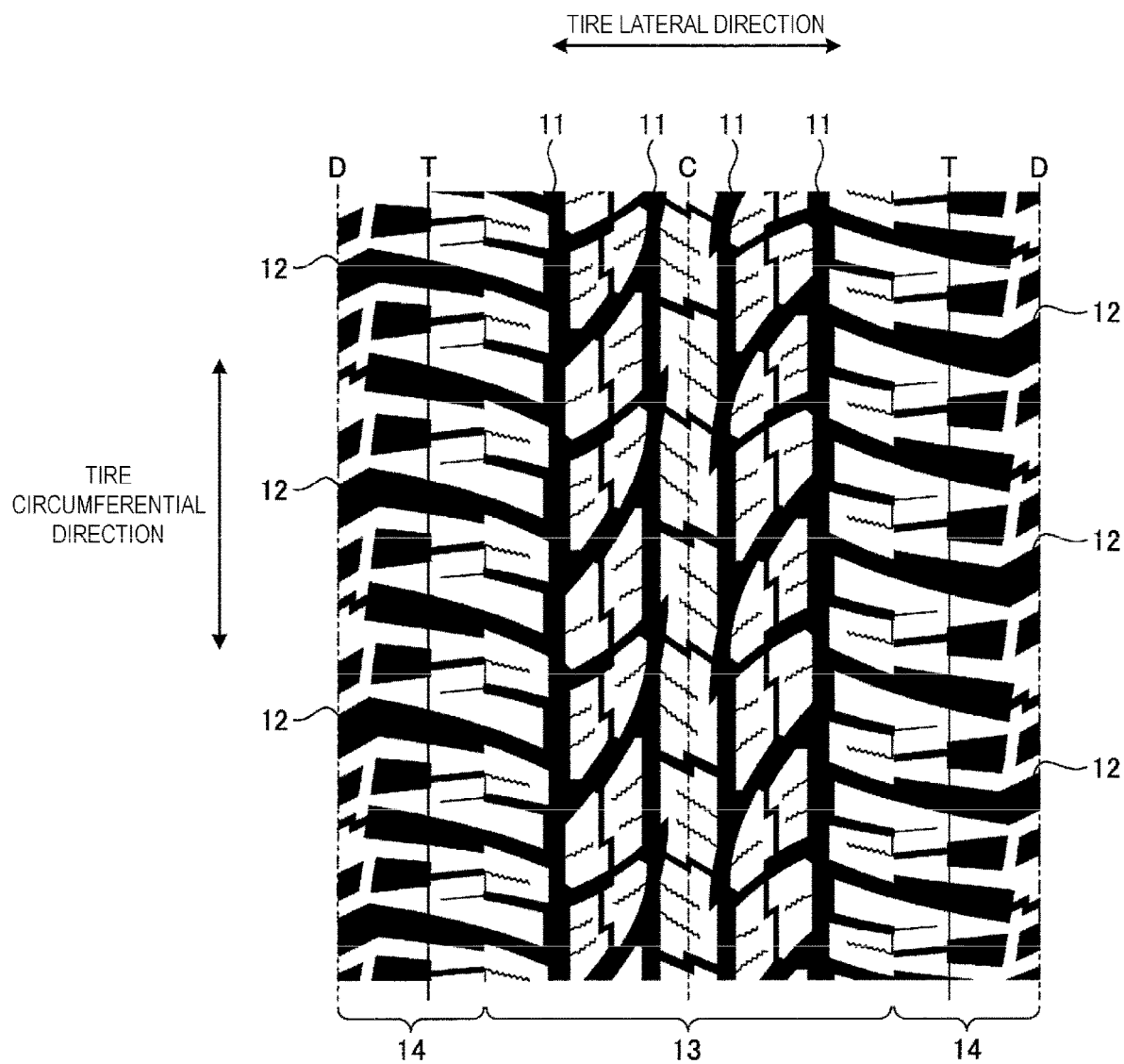
FIG. 4 is a diagram illustrating an example of a tread portion of the tire according to the first embodiment.

FIG. 4 is a plan view illustrating a portion of the tread portion 6. As illustrated in FIGS. 2, 3, and 4, the tread portion 6 includes the tread rubber 8 and has grooves 10 formed into a predetermined pattern design. The grooves 10 are provided in the tread rubber 8. The tread rubber 8 protects the carcass 2. The tread portion 6 includes land portions disposed between the grooves 10, and the land portions have ground contact surfaces (road contact surfaces) coming into contact with a road surface. The grooves 10 include a plurality of main grooves 11 arranged in the tire circumferential direction and lug grooves 12 at least partially arranged in the tire lateral direction. The tread portion 6 also includes a center portion 13 including the tire center C and shoulder portions 14 disposed on both sides of the center portion 13 in the tire lateral direction.

The sidewall portions 7 include the side rubbers 9 and are disposed on both sides of the tread portion 6 in the tire lateral direction. The side rubbers 9 protect the carcass 2.

The sidewall portions 7 are adjacent to ends D of the tread portion 6 in the tire lateral direction. The ends D are end portions of the pattern design of the tread portion 6 in the tire lateral direction. The ends D are boundary portions between the tread portion 6 and the sidewall portions 7. The grooves 10 are formed inside the boundary portions (ends) D in the tire lateral direction. That is, the boundary portions D are end portions, in the tire lateral direction, of the grooves 10 formed into the predetermined design pattern in the tread portion 6. Ends of the lug grooves 12 in the tire lateral direction are located at the boundary portions D. Herein, the boundary portions D of the tread portion 6 in the tire lateral direction are referred to as "design ends D" as appropriate. The design ends D are located outside the ground contact edges T in the tire lateral direction.

The surfaces of the sidewall portions 7 are composed of the surfaces of the side rubbers 9. The surfaces of the sidewall portions 7 are located outside the design ends D in the tire lateral direction with respect to the tire center C. The maximum tire width positions E are located on the surfaces of the sidewall portions 7. The surfaces of the sidewall portions 7 include regions between the design ends D and rim check lines R on the surfaces of the side rubbers 9. The maximum tire width positions E are located between the design ends D and the rim check lines R. The design ends D and the rim check lines R are separated from each other by a distance L in the tire radial direction.

The rim check lines R are lines for checking a state of mounting the tire 1 on a rim. The rim check lines R are used to check whether the tire 1 is normally mounted on a rim. Typically, the rim check lines R are indicated as annular convex lines continuous along rim flanges in the tire circumferential direction, on the surfaces of the bead portions 5 located outside the rim flanges in the tire radial direction.

The serration portions 100 are disposed on the surfaces of the sidewall portions 7. The serration portions 100 each include a plurality of ridges 200. The ridges 200 are protrusions. The ridges 200 are disposed on the surfaces of the sidewall portions 7, projecting outward from the surfaces of the sidewall portions 7 in the tire lateral direction. The ridges 200 are disposed between the design ends D and the rim check lines R on the surfaces of the sidewall portions 7.

Serration Portion

Figure 5:
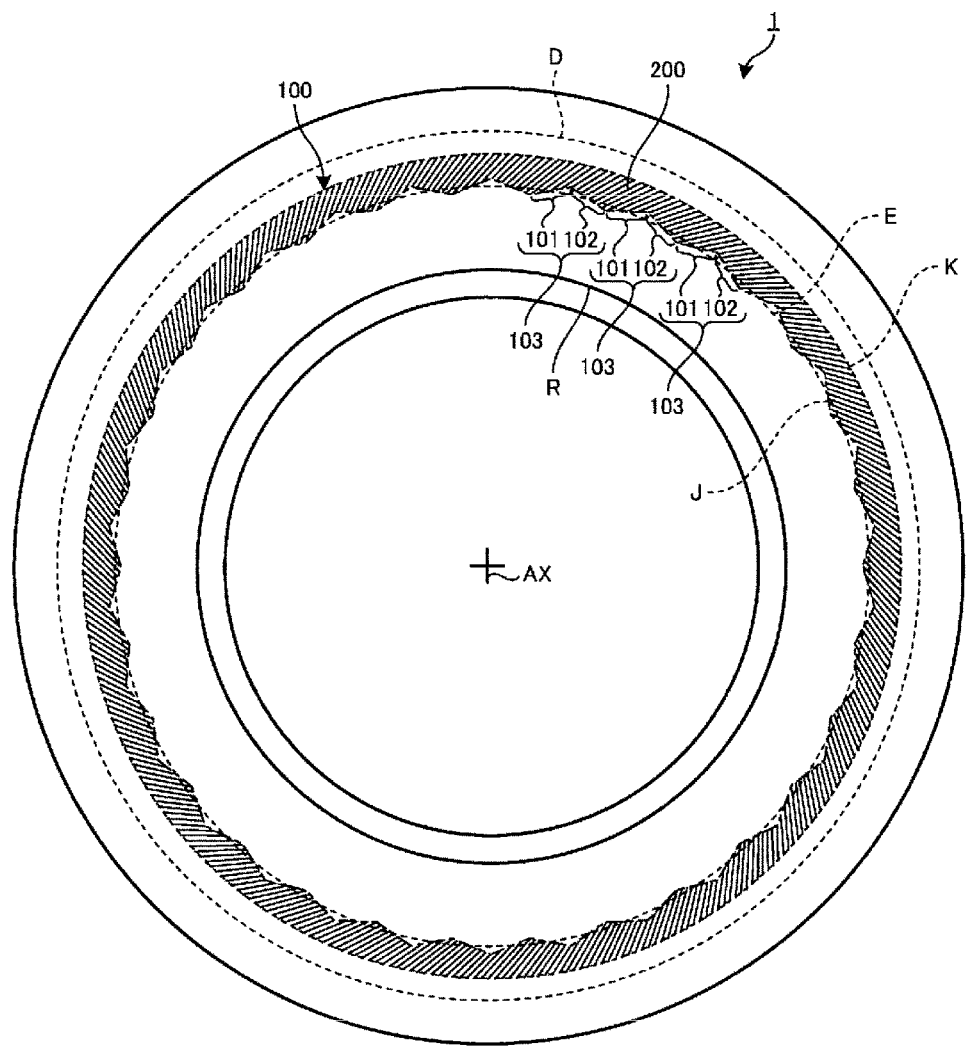
FIG. 5 is a side view illustrating an example of the tire according to the first embodiment.
Figure 6:
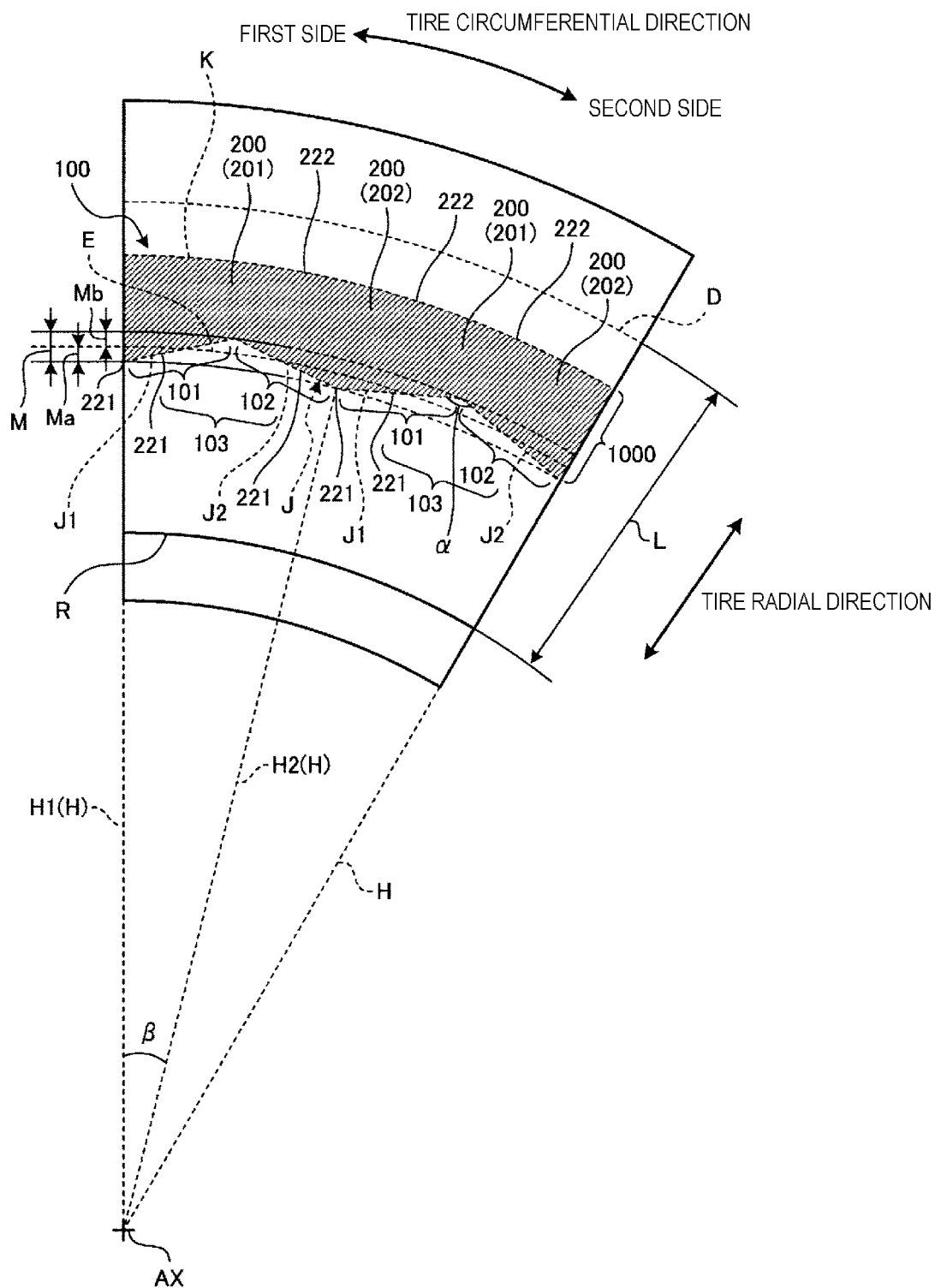
FIG. 6 is a partially enlarged view of FIG. 5.
Figure 7:
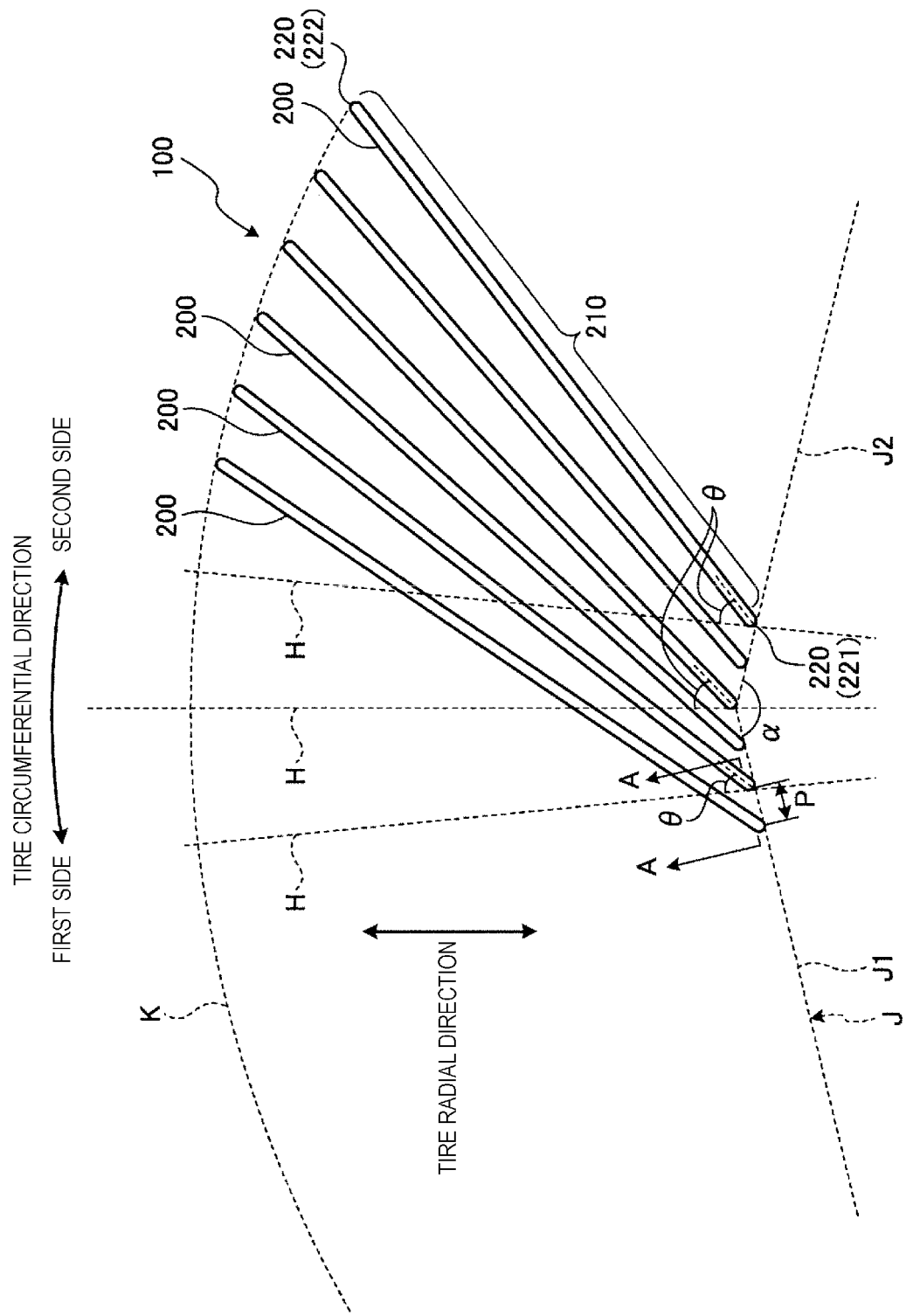
FIG. 7 is a partially enlarged view of FIG. 6.
Figure 8:
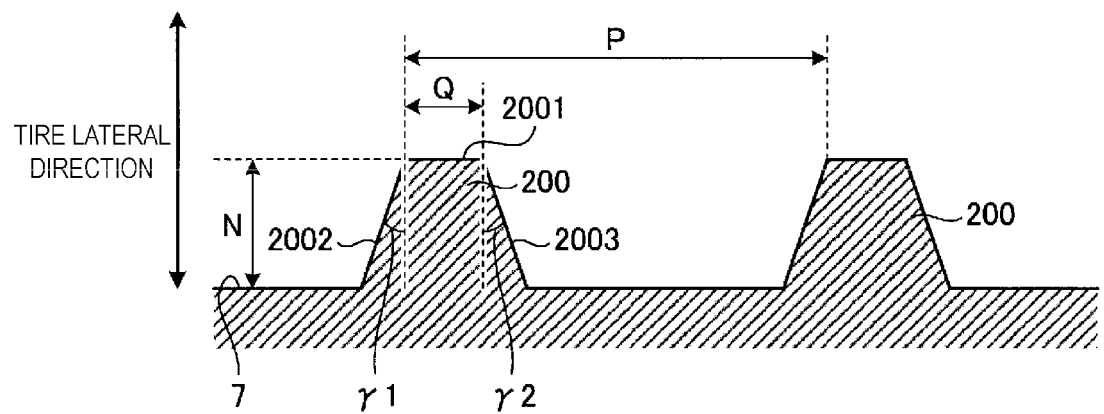
FIG. 8 is a cross-sectional view taken along line A-A in FIG. 7.

FIG. 5 is a diagram schematically illustrating the sidewall portion 7 of the tire 1. FIG. 6 is a partially enlarged view of FIG. 5. FIG. 7 is an enlarged view of the serration portion 100. FIG. 8 is a cross-sectional view of the serration portion 100, taken along line A-A in FIG. 7.

As illustrated in FIGS. 5, 6, 7, and 8, the serration portion 100 including the ridges 200 is disposed on the surface of the sidewall portion 7. The ridges 200 are arranged at intervals in the tire circumferential direction on the surface of the sidewall portion 7.

The ridges 200 are made from a rubber. The ridges 200 are shaped into lines in a plane orthogonal to the rotation axis AX. The ridges 200 each include a linear portion 210 and end portions 220. The end portions 220 consist of a first end portion 221 being one end of the linear portion 210 and a second end portion 222 being the other end of the linear portion 210. The second end portion 222 is located outside the first end portion 221 in the tire radial direction. Herein, the first end portion 221 is referred to as "inner end portion 221", and the second end portion 222 is referred to as "outer end portion 222", as appropriate.

The inner end portion 221 is located innermost in the tire radial direction in the ridge 200. The outer end portion 222 is located outermost in the tire radial direction in the ridge 200.

The ridge 200 inclines with respect to a radial line H from the rotation axis AX so that the inner end portion 221 is located on the first side of the outer end portion 222 in the tire circumferential direction. As illustrated in FIG. 7, the angle θ between the radial line H from the rotation axis AX and the ridge 200 is 45°.

The ridges 200 are arranged at regular intervals in the tire circumferential direction. The distances P between adjacent ridges 200 are equal. "Distance P" refers to the distance between the inner end portion 221 of one ridge 200 and the inner end portion 221 of another ridge 200 adjacent to the one ridge 200.

As illustrated in FIG. 6, the serration portion 100 includes first ridge groups 101 and second ridge groups 102. The first ridge groups 101 each include a plurality of ridges 200 that are arranged adjacent to each other in the tire circumferential direction and that have the inner end portions 221 of which the distances from the rotation axis AX gradually change. The second ridge groups 102 each include a plurality of ridges 200 that are arranged adjacent to each other in the tire circumferential direction and that have the inner end portions 221 of which the distances from the rotation axis AX gradually change. The first ridge groups 101 and the second ridge groups 102 are adjacent to each other in the tire circumferential direction.

Herein, the ridges 200 of the first ridge groups 101 are referred to as "first ridges 201", and the ridges 200 of the second ridge groups 102 are referred to as "second ridges 202", as appropriate.

The inner end portion 221 of the first ridge 201 located farthest on the first side in the tire circumferential direction among the first ridges 201 of each of the first ridge groups 101 is located inside the maximum tire width position E in the tire radial direction, and the inner end portion 221 of the first ridge 201 located farthest on the second side in the tire circumferential direction is located outside the maximum tire width position E in the tire radial direction.

The inner end portion 221 of the second ridge 202 located farthest on the first side in the tire circumferential direction among the second ridges 202 of each of the second ridge groups 102 is located outside the maximum tire width position E in the tire radial direction, and the inner end portion 221 of the second ridge 202 located farthest on the second side in the tire circumferential direction is located inside the maximum tire width position E in the tire radial direction.

The inner end portions 221 in the first ridge group 101 are arranged so that the distances from the rotation axis AX gradually increase from the first side toward the second side in the tire circumferential direction. The inner end portions 221 in the second ridge group 102 are arranged so that the distances from the rotation axis AX gradually decrease from the first side toward the second side in the tire circumferential direction.

A first imaginary line J1 connecting the inner end portions 221 in the first ridge group 101 extends from the inside toward the outside of the maximum tire width position E in the tire radial direction. The end of the first imaginary line J1 on the first side in the tire circumferential direction is located inside the maximum tire width position E in the tire radial direction, and the end of the first imaginary line J1 on the second side in the tire circumferential direction is located outside the maximum tire width position E in the tire radial direction. The first imaginary line J1 inclines with respect to a radial line from the rotation axis AX so that the inner end of the first imaginary line J1 in the tire radial direction is located on the first side in the tire circumferential direction with respect to the outer end of the first imaginary line J1 in the tire radial direction.

A second imaginary line J2 connecting the inner end portions 221 in the second ridge group 102 extends from the outside toward the inside of the maximum tire width position E in the tire radial direction. The end of the second imaginary line J2 on the first side in the tire circumferential direction is located outside the maximum tire width position E in the tire radial direction, and the end of the second imaginary line J2 on the second side in the tire circumferential direction is located inside the maximum tire width position E in the tire radial direction. The second imaginary line J2 inclines with respect to a radial line from the rotation axis AX so that the outer end of the second imaginary line J2 in the tire radial direction is located on the first side in the tire circumferential direction with respect to the inner end of the second imaginary line J2 in the tire radial direction.

In the present embodiment, the angle α between the first imaginary line J1 connecting the inner end portions 221 in the first ridge group 101 and the second imaginary line J2 connecting the inner end portions 221 in the second ridge group 102 is greater than 90°. The angle α is 110° or greater and 170° or less.

A plurality of ridge groups 103 each composed of the first ridge group 101 and the second ridge group 102 are disposed adjacent to each other in the tire circumferential direction. That is, the first imaginary lines J1 connecting the inner end portions 221 in the first ridge groups 101 and the second imaginary lines J2 connecting the inner end portions 222 in the second ridge groups 102 form a zigzag inner imaginary line J along the maximum tire width position E in the tire circumferential direction. The zigzag inner imaginary line J is arranged across the maximum tire width position E between the design end D and the rim check line R in the plane orthogonal to the rotation axis AX.

The first imaginary lines J1 are linear, and the second imaginary lines J2 are linear. The first imaginary lines J1 and the second imaginary lines J2 have the same length. The angles α in the ridge groups 103 are equal. The zigzag inner imaginary line J is formed uniformly in the tire circumferential direction.

The outer end portions 222 of the ridges 200 including the first ridges 201 and the second ridges 202 are located outside the maximum tire width position E in the tire radial direction. An outer imaginary line K connecting the outer end portions 222 of the ridges 200 is circular in the plane orthogonal to the rotation axis AX. The outer imaginary line K is arranged surrounding the rotation axis AX between the design end D and the rim check line R. The distances between the outer end portions 222 and the rotation axis AX are equal.

The serration portion 100 is disposed in a serration region 1000 located between the inner imaginary line J and the outer imaginary line K on the surface of the sidewall portion 7.

As illustrated in FIG. 6, the angle θ between a first radial line H1 connecting the rotation axis AX and the inner end portion 221 located farthest on the first side in the tire circumferential direction among the inner end portions 221 in each of the ridge groups 103 and a second radial line H2 connecting the rotation axis AX and the inner end portion 221 located farthest on the second side in the tire circumferential direction is 3° or greater and 30° or less. This indicates that in the present embodiment, the number of the ridge groups 103 of the tire 1 is 12 or greater and 120 or less. In the present embodiment, the inner end portion 221 located farthest on the first side in the tire circumferential direction is the inner end portion 221 of the first ridge 201 located farthest on the first side in the tire circumferential direction among the first ridges 201 of the first ridge group 101. The inner end portion 221 located farthest on the second side in the tire circumferential direction is the inner end portion 221 of the second ridge 202 located farthest on the second side in the tire circumferential direction among the second ridges 202 of the second ridge group 102.

The distance M, in the tire radial direction, between the inner end portion 221 located innermost and the inner end portion 221 located outermost in the tire radial direction among the inner end portions 221 of the ridges 200 is 5% or greater and 40% or less of the distance L between the design end D and the rim check line R in the tire radial direction.

The distance Ma, in the tire radial direction, between the maximum tire width position E and the inner end portion 221 located innermost in the tire radial direction among the inner end portions 221 of the ridges 200 is equal to the distance Mb, in the tire radial direction, between the maximum tire width position E and the inner end portion 221 located outermost in the tire radial direction. That is, the inner imaginary line J is arranged in a zigzag manner with the maximum tire width position E being the center of amplitude.

As illustrated in FIG. 8, the ridges 200 each project outward from the surface of the sidewall portion 7 in the tire lateral direction. The ridge 200 has a trapezoidal cross section. The ridge 200 includes an outer surface 2001 located outermost in the tire lateral direction, and an inclined surface 2002 and an inclined surface 2003 connecting the surface of the sidewall portion 7 and the outer surface 2001. The projection amount (height) N of the ridge 200 from the surface of the sidewall portion 7 is 0.3 mm. The width Q of the outer surface 2001 of the ridge 200 is 0.3 mm. The angle γ1 between the outer surface 2001 and the inclined surface 2002 is 30°. The angle γ2 between the outer surface 2001 and the inclined surface 2003 is 30°. The distance P between adjacent ridges 200 is 1 mm.

As illustrated in FIGS. 2 and 3, the outer end portions of the carcass folded back portions 22 in the tire radial direction are located outside the maximum tire width positions E in the tire radial direction. The inner end portions of the serration portions 100 are located inside the outer end portions of the carcass folded back portions 22 in the tire radial direction, and the outer end portions of the serration portions 100 are located outside the outer end portions of the carcass folded back portions 22.

Method for Manufacturing Pneumatic Tire

Figure 9:
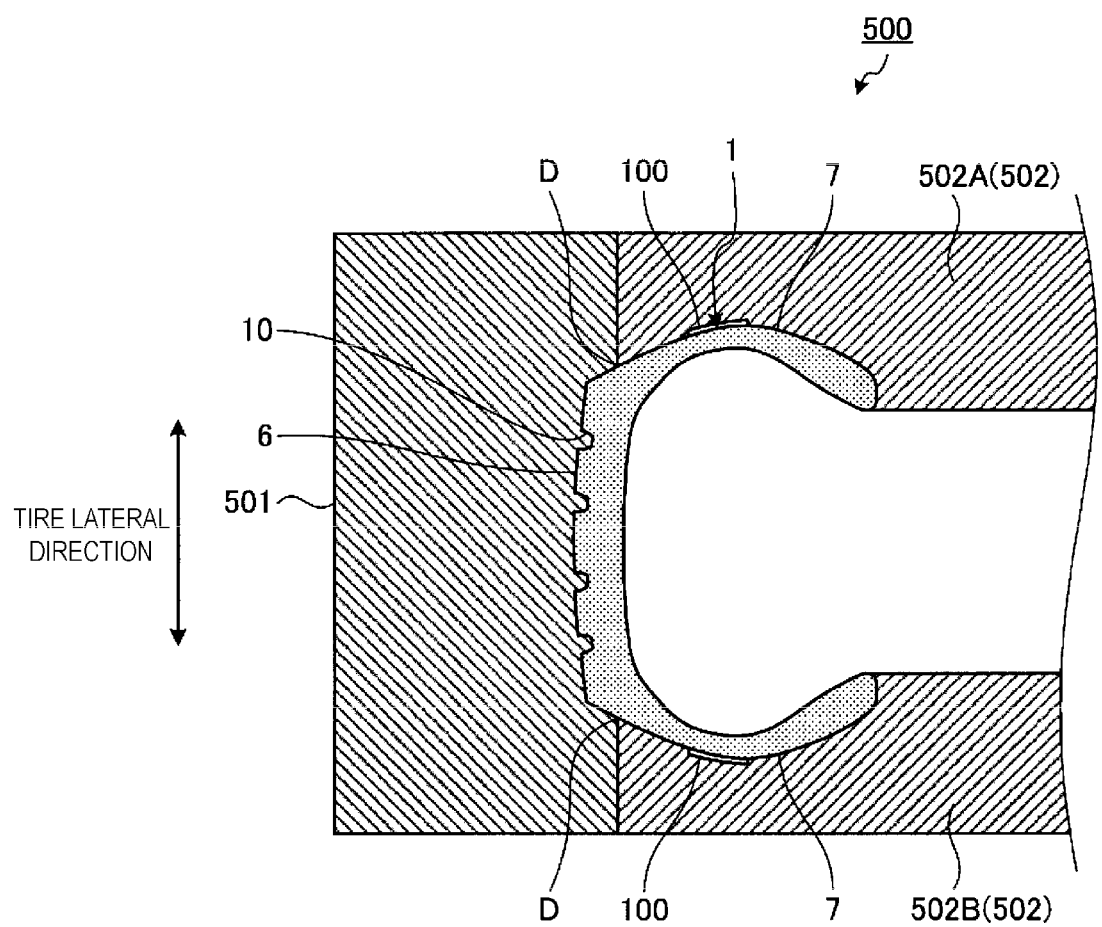
FIG. 9 is a diagram illustrating an example of a tire mold according to the first embodiment.

Next, an example of a method of manufacturing the tire 1 will be described. FIG. 9 is a cross-sectional view schematically illustrating a tire mold 500 being part of a system for manufacturing the tire 1. The mold 500 is a mold for vulcanization. A green tire is disposed inside the mold 500. The green tire is supported by the mold 500 when vulcanized.

The mold 500 includes a plurality of sector molds 501 arranged in the tire circumferential direction for forming the tread portion 6 of the tire 1 and a side mold 502 for forming the sidewall portions 7 of the tire 1.

The sector molds 501 are members of an annular mold divided in the tire circumferential direction. The sector molds 501 are arranged in the tire circumferential direction. Each of the sector molds 501 is movable in the tire radial direction. The sector molds 501 move inward in the tire radial direction to come into contact with the tread portion 6 of the tire 1. The sector molds 501 move outward in the tire radial direction to separate from the tread portion 6 of the tire 1. The sector molds 501 move inward in the tire radial direction to form an integrated annular mold. The sector molds 501 move outward in the tire radial direction to become divided.

The tread portion 6 is formed by the sector molds 501. The sector molds 501 include projection portions projecting inward in the tire radial direction from the inner surfaces, facing the tread portion 6, of the sector molds 501. The projection portions of the sector molds 501 form the pattern design including the grooves 10, on the tread rubber 8.

The side mold 502 includes an upper side mold 502A and a lower side mold 502B. The tire 1 is disposed between the upper side mold 502A and the lower side mold 502B. The upper side mold 502A moves upward to separate from the sidewall portion 7 of the tire 1. The upper side mold 502A moves downward to come into contact with the sidewall portion 7 of the tire 1. The lower side mold 502B moves downward to separate from the sidewall portion 7 of the tire 1. The lower side mold 502B moves upward to come into contact with the sidewall portion 7 of the tire 1.

The sidewall portions 7 are formed by the side mold 502. The side mold 502 includes corrugated portions disposed on the inner surfaces, facing the sidewall portions 7, of the side mold 502. The corrugated portions of the side mold 502 form the serration portions 100 on the side rubbers 9.

The design ends D coincide with the boundaries between the sector molds 501 and the side mold 502.

Actions and Effects

As described above, according to the present embodiment, each of the serration portions 100 including the line-shaped ridges 200 is disposed on the sidewall portion 7 and thus reinforces the sidewall portion 7. This configuration prevents generation of cracks on the sidewall portion 7.

The inner end portions 221 in the first ridge groups 101 are arranged in the tire circumferential direction so that the distances from the rotation axis AX gradually increase from the inside toward the outside of the maximum tire width position E. The inner end portions 221 in the second ridge groups 102 are arranged in the tire circumferential direction so that the distances from the rotation axis AX gradually decrease from the outside toward the inside of the maximum tire width position E. Since the ridges 200 are arranged from one of the inside and the outside of the maximum tire width position E toward the other, aesthetics of the tire 1 is improved.

The side rubber 9 of the sidewall portion 7 in the maximum tire width position E is thin, and a portion where the maximum tire width position E is located in the sidewall portion 7 deflects and deforms significantly. Thus, cracks are highly likely to be generated at the portion where the maximum tire width position E is located in the sidewall portion 7. Since the surface of the sidewall portion 7 including the maximum tire width position E is at least partially covered with the ridges 200, generation of cracks is prevented. Even if a crack is generated on the sidewall portion 7, the ridges 200 make the crack inconspicuous, resulting in prevention of poor appearance of the tire 1.

Even if the internal structure of the tire 1, such as the carcass folded back portions 22, causes irregularities to be formed on the surface of the sidewall portion 7, the irregularities are camouflaged with the ridges 200. Thus, poor appearance of the tire 1 is prevented.

If the inner end portions 221 of the ridges 200 are concentrated in the maximum tire width position E, a crack generated in the maximum tire width position E is highly likely to grow along the inner end portions 221 located in the maximum tire width position E. In the present embodiment, the first ridges 201 are arranged on the surface of the sidewall portion 7 so that the first imaginary lines J1 connecting the inner end portions 221 in the first ridge groups 101 incline from the inside toward the outside of the maximum tire width position E, and the second ridges 202 are arranged on the surface of the sidewall portion 7 so that the second imaginary lines J2 connecting the inner end portions 221 in the second ridge groups 102 incline from the outside toward the inside of the maximum tire width position E. This configuration prevents the inner end portions 221 from being concentrated in the maximum tire width position E. Since the ridges 200 are arranged at intervals, the inner end portions 221 are separated from each other. Even if a crack is generated in the maximum tire width position E, the separated inner end portions 221 prevent propagation and growth of the crack. Poor appearance of the tire 1 and growth of cracks are prevented, resulting in prevention of a decrease in quality of the tire 1 due to cracks.

In the present embodiment, the ridge groups 103 composed of the first ridge groups 101 and the second ridge groups 102 are disposed adjacent to each other in the tire circumferential direction, and the first imaginary lines J1 connecting the inner end portions 221 in the first ridge groups 101 and the second imaginary lines J2 connecting the inner end portions 221 in the second ridge groups 102 form the zigzag inner imaginary line J in the tire circumferential direction. The inner end portions 221 arranged in a zigzag manner in the tire circumferential direction prevent stress concentration in the sidewall portion 7 and prevent generation and growth of cracks. The inner end portions 221 arranged in a zigzag manner improve aesthetics of the tire 1.

In the present embodiment, the angle β between the first radial line H1 connecting the rotation axis AX and the inner end portion 221 of the first ridge 201 located farthest on the first side in the tire circumferential direction in the first ridge group 101 of each of the ridge groups 103 and the second radial line H2 connecting the rotation axis AX and the inner end portion 221 of the second ridge 202 located farthest on the second side in the tire circumferential direction in the second ridge group 102 is determined to be 3° or greater and 30° or less. This configuration determines a suitable size and number of the ridge groups 103 (size and number of the zigzags), resulting in prevention of generation and growth of cracks and improvement in aesthetics of the tire 1.

In the present embodiment, the ridges 200 are disposed between the design end D and the rim check line R on the surface of the sidewall portion 7. The distance M, in the tire radial direction, between the inner end portion 221 located innermost and the inner end portion 221 located outermost in the tire radial direction is determined to be 5% or greater and 40% or less of the distance L between the design end D and the rim check line R in the tire radial direction. The distance M, in the tire radial direction, between the inner end portion 221 located innermost and the inner end portion 221 located outermost in the tire radial direction indicates amplitude of the inner end portions 221 arranged in a zigzag manner (zigzag width). If the zigzag width M is less than 5% of the distance L between the design end D and the rim check line R in the tire radial direction, the inner end portions 221 are concentrated in the maximum tire width position E. This may cause insufficient prevention of generation and growth of cracks. If the zigzag width M is greater than 40% of the distance L between the design end D and the rim check line R in the tire radial direction, aesthetics of the tire 1 may be impaired. A zigzag width M of 5% or greater and 40% or less of the distance L between the design end D and the rim check line R in the tire radial direction can improve aesthetics and prevent generation and growth of cracks.

In the present embodiment, the inner end portions 221 of the ridges 200 form the zigzag inner imaginary line J, and the outer end portions 222 of the ridges 200 located outside the maximum tire width position E in the tire radial direction form the circular outer imaginary line K. The serration region 1000 where the serration portion 100 is disposed is located mainly outside the maximum tire width position E in the tire radial direction. This configuration improves aesthetics of the tire 1 and prevents generation and growth of cracks.

In the present embodiment, the angle θ between the radial line H and each of the ridges 200 is 45°. The angle θ may be a desirable value from 20° to 60°. The angle θ may be 0°. In other words, the radial line H and the ridge 200 may be parallel with each other. The same applies to the embodiments described below.

In the present embodiment, the ridges 200 are arranged at regular intervals in the tire circumferential direction. The ridges 200 may be arranged at irregular intervals in the tire circumferential direction. For example, the serration portion 100 may include groups of ridges 200 in which the distance P between adjacent ridges 200 is a first distance and groups of ridges 200 in which the distance P between adjacent ridges 200 is a second distance greater than the first distance. In other words, groups of ridges 200 in which the ridges 200 are arranged more dense and groups of ridges 200 in which the ridges 200 are arranged sparser may be provided. The same applies to the embodiments described below.

In the present embodiment, the distance Ma and the distance Mb are equal. The distance Ma and the distance Mb may be mutually different. The same applies to the embodiments described below.

Second Embodiment

A second embodiment will now be described. Herein, identical or substantially similar constituents to those of the above-described embodiment are assigned with the same reference signs, and descriptions thereof are either simplified or omitted.

Figure 10:
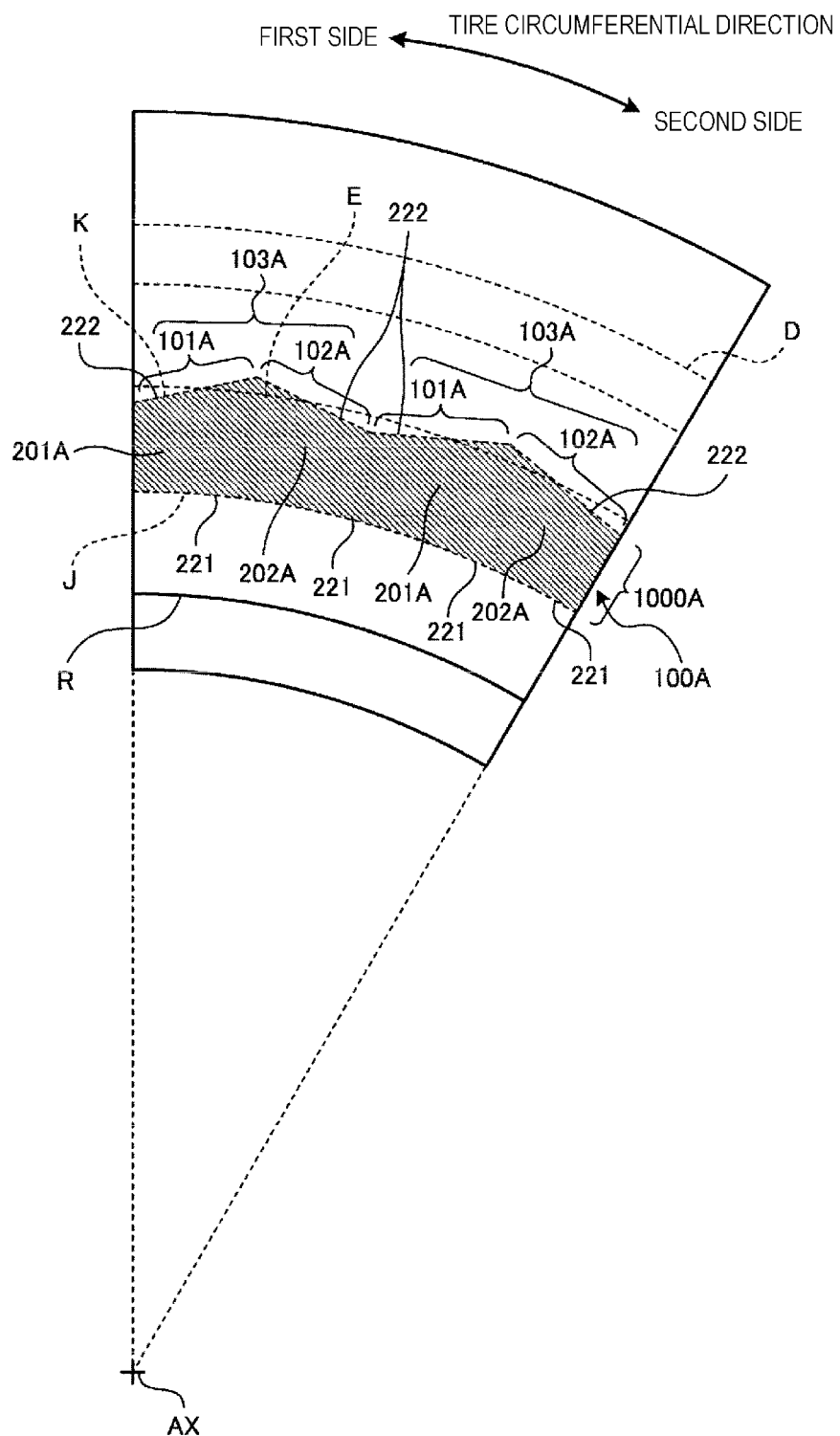
FIG. 10 is a diagram schematically illustrating a portion of a tire according to a second embodiment.

FIG. 10 is a diagram illustrating an example of a serration portion 100A according to the present embodiment. The serration portion 100A according to the second embodiment is a modified example of the serration portion 100 described in the first embodiment. As illustrated in FIG. 10, the serration portion 100A includes first ridge groups 101A and second ridge groups 102A. The first ridge groups 101A each include a plurality of first ridges 201A that are arranged adjacent to each other in the tire circumferential direction and that have outer end portions 222 of which the distances from the rotation axis AX gradually change. The second ridge groups 102A each include a plurality of second ridges 202A that are arranged adjacent to each other in the tire circumferential direction and that have outer end portions 222 of which the distances from the rotation axis AX gradually change. The first ridge groups 101A and the second ridge groups 102A are adjacent to each other in the tire circumferential direction.

The outer end portion 222 of the first ridge 201A located farthest on the first side in the tire circumferential direction in each of the first ridge groups 101A is located inside the maximum tire width position E in the tire radial direction. The outer end portion 222 of the first ridge 201A located farthest on the second side in the tire circumferential direction in the first ridge group 101A is located outside the maximum tire width position E in the tire radial direction.

The outer end portion 222 of the second ridge 202A located farthest on the first side in the tire circumferential direction in each of the second ridge groups 102A is located outside the maximum tire width position E in the tire radial direction. The outer end portion 222 of the second ridge 202A located farthest on the second side in the tire circumferential direction in the second ridge group 102A is located inside the maximum tire width position E in the tire radial direction.

A plurality of ridge groups 103A each composed of the first ridge group 101A and the second ridge group 102A are disposed adjacent to each other in the tire circumferential direction.

That is, in the example illustrated in FIG. 10, an outer imaginary line K connecting the outer end portions 222 in the first ridge groups 101A and the second ridge groups 102A is arranged in a zigzag manner with the maximum tire width position E being the center of amplitude. An inner imaginary line J connecting inner end portions 221 in the first ridge groups 101A and the second ridge groups 102A is circular. The inner imaginary line J is arranged inside the maximum tire width position E in the tire radial direction.

As described above, a serration region 1000A where the serration portion 100A is disposed may be located mainly inside the maximum tire width position E in the tire radial direction.

Third Embodiment

A third embodiment will now be described. Herein, identical or substantially similar constituents to those of the above-described embodiments are assigned with the same reference signs, and descriptions thereof are either simplified or omitted.

Figure 11:
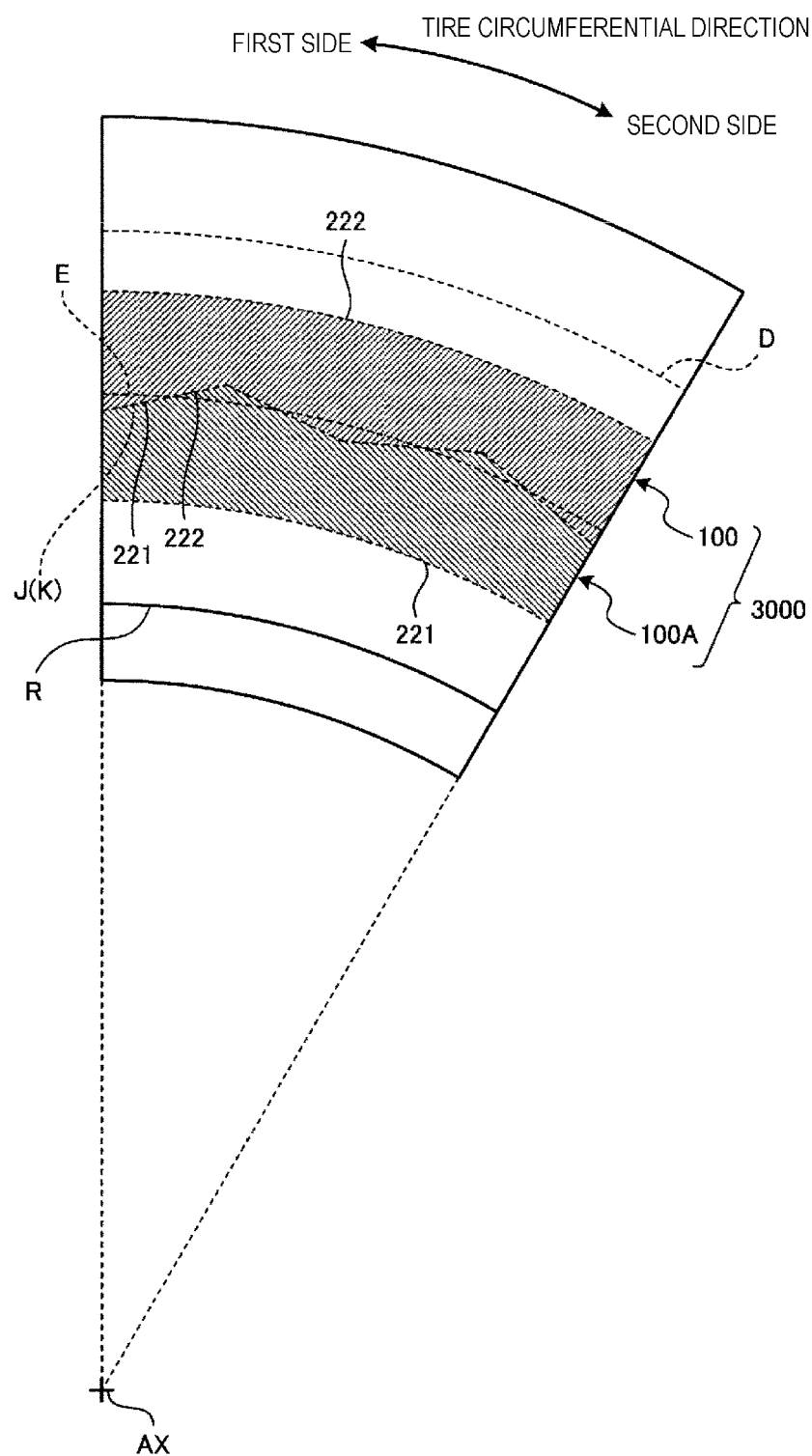
FIG. 11 is a diagram schematically illustrating a portion of a tire according to a third embodiment.
Figure 12:
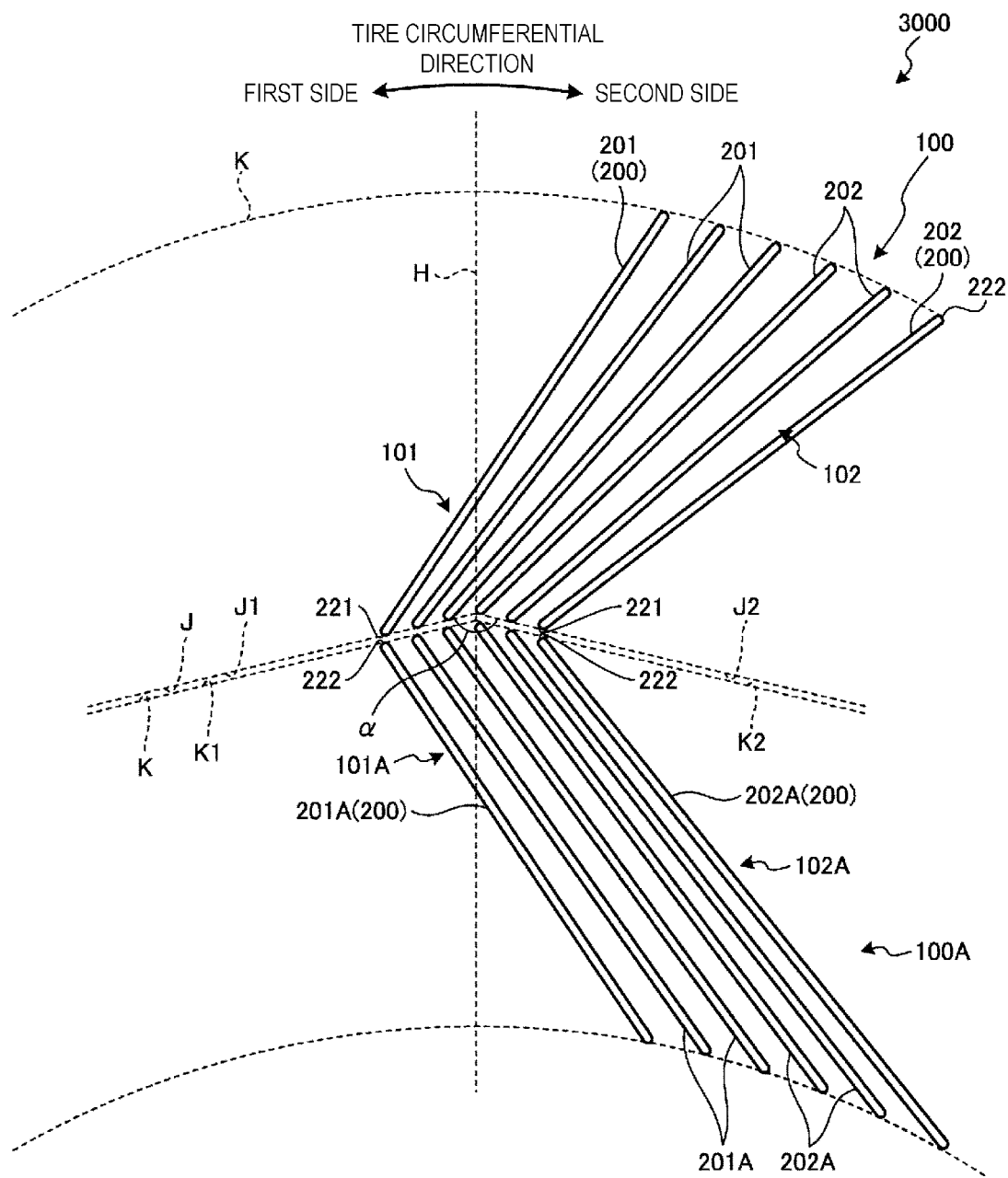
FIG. 12 is a partially enlarged view of FIG. 11.

FIG. 11 is a diagram illustrating an example of a serration portion 3000 according to the present embodiment. FIG. 12 is a partially enlarged view of FIG. 11. As illustrated in FIGS. 11 and 12, the serration portion 3000 according to the present embodiment is a combination of the serration portion 100 described in the first embodiment and the serration portion 100A described in the second embodiment. That is, the serration portion 3000 includes a first serration portion 100 that includes a plurality of inner end portions 221 forming a zigzag inner imaginary line J and a second serration portion 100A that is at least partially disposed inside the first serration portion 100 in the tire radial direction and that includes a plurality of ridges 200 having outer end portions 222 facing the inner end portions 221 of the ridges 200 of the first serration portion 100.

The ridges 200 of the first serration portion 100 each incline with respect to a radial line H from the rotation axis AX so that the inner end portion 221 is located on the first side of the outer end portion 222 in the tire circumferential direction.

The ridges 200 of the second serration portion 100A each incline with respect to a radial line H from the rotation axis AX so that the outer end portion 222 is located on the first side of the inner end portion 221 in the tire circumferential direction.

First ridge groups 101 of the first serration portion 100 each include a plurality of first ridges 201 that are arranged adjacent to each other in the tire circumferential direction and that have the inner end portions 221 of which the distances from the rotation axis AX gradually increase from the first side toward the second side in the tire circumferential direction.

Second ridge groups 102 of the first serration portion 100 each include a plurality of second ridges 202 that are arranged adjacent to each other in the tire circumferential direction and that have the inner end portions 221 of which the distances from the rotation axis AX gradually decrease from the first side toward the second side in the tire circumferential direction.

First ridge groups 101A of the second serration portion 100A each include a plurality of first ridges 201A that are arranged adjacent to each other in the tire circumferential direction and that have the outer end portions 222 of which the distances from the rotation axis AX gradually increase from the first side toward the second side in the tire circumferential direction.

Second ridge groups 102A of the second serration portion 100A each include a plurality of second ridges 202A that are arranged adjacent to each other in the tire circumferential direction and that have the outer end portions 222 of which the distances from the rotation axis AX gradually decrease from the first side toward the second side in the tire circumferential direction.

The inner end portions 221 of the first serration portion 100 form a zigzag inner imaginary line J. The outer end portions 222 of the first serration portion 100 form a circular outer imaginary line K.

The outer end portions 222 of the second serration portion 100A form a zigzag outer imaginary line K. The inner end portions 221 of the second serration portion 100A form a circular inner imaginary line J.

The inner end portions 221 in the first ridge groups 101 of the first serration portion 100 face the outer end portions 222 in the first ridge groups 101A of the second serration portion 100A.

The inner end portions 221 in the second ridge groups 102 of the first serration portion 100 face the outer end portions 222 in the second ridge groups 102A of the second serration portion 100A.

A third imaginary line K1 connecting the outer end portions 222 in each of the first ridge groups 101A of the second serration portion 100A is parallel with the first imaginary line J1. A fourth imaginary line K2 connecting the outer end portions 222 in each of the second ridge groups 102A of the second serration portion 100A is parallel with the second imaginary line J2.

The angle α between the first imaginary line J1 connecting the inner end portions 221 in the first ridge group 101 of the first serration portion 100 and the second imaginary line J2 connecting the inner end portions 221 in the second ridge group 102 of the first serration portion 100 is greater than 90°.

As illustrated in FIG. 12, the ridges 200 of the first serration portion 100 and the ridges 200 of the second serration portion 100A are separated from each other.

As described above, according to the present embodiment, both the first serration portion 100 disposed mainly outside the maximum tire width position E in the tire radial direction and the second serration portion 100A disposed mainly inside the maximum tire width position E in the tire radial direction are provided, and the inner end portions 221 of the ridges 200 of the first serration portion 100 face the outer end portions 222 of the ridges 200 of the second serration portion 100A. Since the surface of the sidewall portion 7 is covered with the ridges 200, generation and growth of cracks are prevented. The surface of the sidewall portion 7 including the maximum tire width position E is covered with the ridges 200, so that irregularities due to a generated crack or the internal structure of the tire 1 are camouflaged.

According to the present embodiment, the ridges 200 of the first serration portion 100 each incline with respect to a radial line H from the rotation axis AX so that the inner end portion 221 is located on the first side of the outer end portion 222 in the tire circumferential direction, and the ridges 200 of the second serration portion 100A each incline with respect to a radial line H from the rotation axis AX so that the outer end portion 222 is located on the first side of the inner end portion 221 in the tire circumferential direction. This configuration improves aesthetics. The light reflection direction of the first serration portion 100 and the light reflection direction of the second serration portion 100A are mutually different, enabling consumers to sense visual aesthetics.

The inner end portions 221 in the first ridge groups 101 of the first serration portion 100 face the outer end portions 222 in the first ridge groups 101A of the second serration portion 100A, and the first imaginary lines J1 connecting the inner end portions 221 in the first ridge groups 101 of the first serration portion 100 and the third imaginary lines K1 connecting the outer end portions 222 in the first ridge groups 101A of the second serration portion 100A are close to and substantially parallel with each other. Similarly, the inner end portions 221 in the second ridge groups 102 of the first serration portion 100 face the outer end portions 222 in the second ridge groups 102A of the second serration portion 100A, and the second imaginary lines J2 connecting the inner end portions 221 in the second ridge groups 102 of the first serration portion 100 and the fourth imaginary lines K2 connecting the outer end portions 222 in the second ridge groups 102A of the second serration portion 100A are close to and substantially parallel with each other. This configuration prevents poor appearance, generation of cracks, and growth of cracks.

In the present embodiment, the ridges 200 of the first serration portion 100 and the ridges 200 of the second serration portion 100A are separated from each other as illustrated in FIG. 12. The ridges 200 of the first serration portion 100 and the ridges 200 of the second serration portion 100A, which are different members, are arranged separately. This configuration prevents stress concentration at the boundary between the ridges 200 of the first serration portion 100 and the ridges 200 of the second serration portion 100A, and prevents generation of cracks. Since the ridges 200 of the first serration portion 100 and the ridges 200 of the second serration portion 100A are separated from each other, propagation of cracks is prevented. Irregularities due to a generated crack or the internal structure of the tire 1 are camouflaged with the ridges 200 of the first serration portion 100 and the ridges 200 of the second serration portion 100A.

Note that in the present embodiment, the ridges 200 of the first serration portion 100 and the ridges 200 of the second serration portion 100A may be in contact with each other. Even if the ridges 200 of the first serration portion 100 and the ridges 200 of the second serration portion 100A are in contact with each other, the ridges 200 of the first serration portion 100 and the ridges 200 of the second serration portion 100A, which are different members, prevent stress concentration at the boundary between the ridges 200 of the first serration portion 100 and the ridges 200 of the second serration portion 100A and prevents generation of cracks. Since the ridges 200 of the first serration portion 100 and the ridges 200 of the second serration portion 100A are different members, propagation of cracks is prevented.

Fourth Embodiment

A fourth embodiment will now be described. Herein, identical or substantially similar constituents to those of the above-described embodiments are assigned with the same reference signs, and descriptions thereof are either simplified or omitted.

Figure 13:
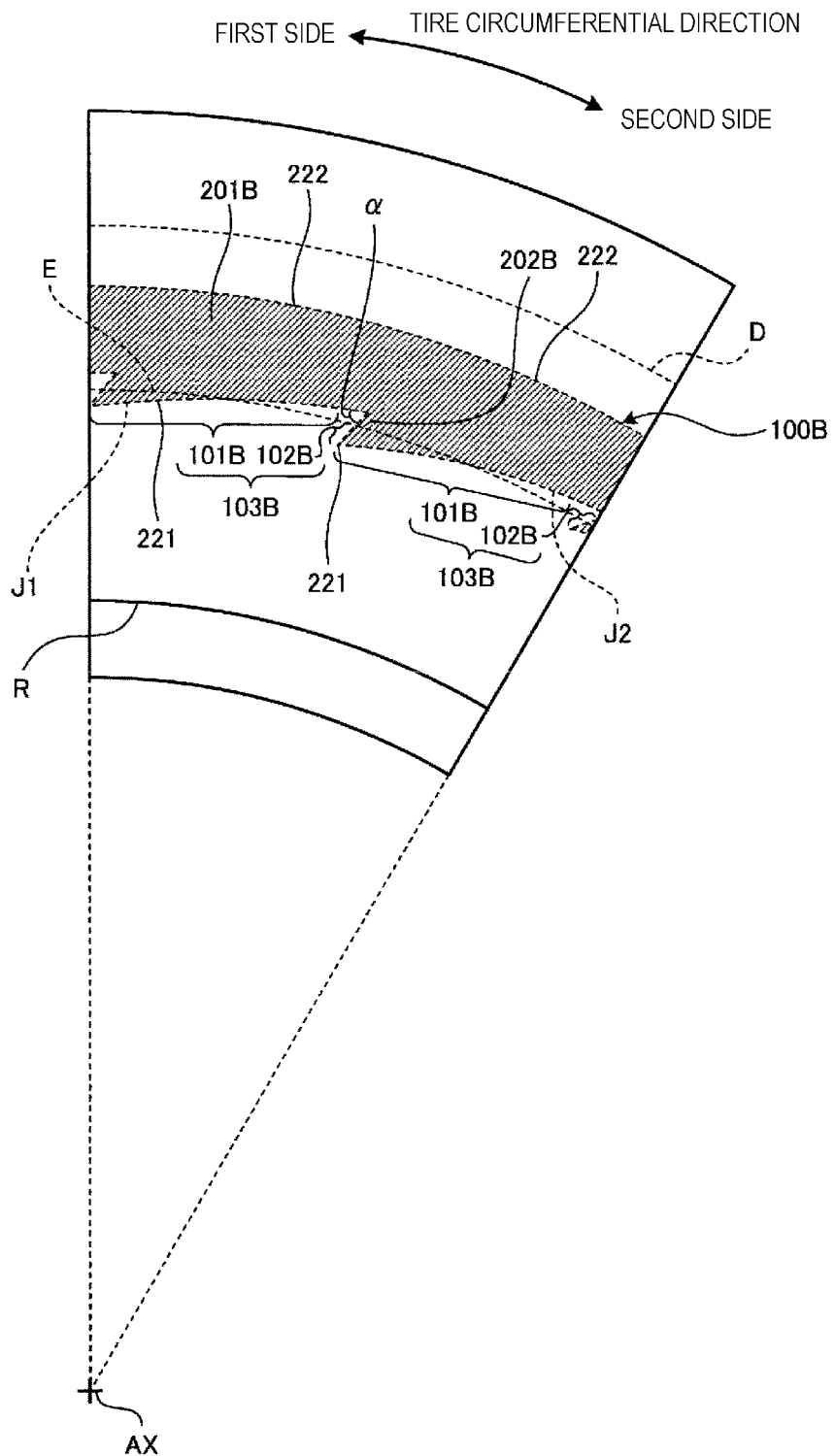
FIG. 13 is a diagram schematically illustrating a portion of a tire according to a fourth embodiment.

FIG. 13 is a diagram illustrating an example of a serration portion 100B according to the present embodiment. As illustrated in FIG. 13, the serration portion 100B includes first ridge groups 101B and second ridge groups 102B. The first ridge groups 101B each include a plurality of first ridges 201B that are arranged adjacent to each other in the tire circumferential direction and that have inner end portion 221 of which the distances from the rotation axis AX gradually change. The second ridge groups 102B each include a plurality of second ridges 202B that are arranged adjacent to each other in the tire circumferential direction and that have inner end portion 221 of which the distances from the rotation axis AX gradually change. The first ridge groups 101B and the second ridge groups 102B are adjacent to each other in the tire circumferential direction.

The inner end portion 221 of the first ridge 201B located farthest on the first side in the tire circumferential direction in each of the first ridge groups 101B is located inside the maximum tire width position E in the tire radial direction. The inner end portion 221 of the first ridge 201B located farthest on the second side in the tire circumferential direction in the first ridge group 101B is located outside the maximum tire width position E in the tire radial direction.

The inner end portion 221 of the second ridge 202B located farthest on the first side in the tire circumferential direction in each of the second ridge groups 102B is located inside the maximum tire width position E in the tire radial direction. The inner end portion 221 of the second ridge 202B located farthest on the second side in the tire circumferential direction in the second ridge group 102B is located outside the maximum tire width position E in the tire radial direction.

A plurality of ridge groups 103B each composed of the first ridge group 101B and the second ridge group 102B are disposed adjacent to each other in the tire circumferential direction.

In the present embodiment, the angle α between the first imaginary line J1 connecting the inner end portions 221 in the first ridge group 101B and the second imaginary line J2 connecting the inner end portions 221 in the second ridge group 102B is less than 90°.

In the present embodiment, the first imaginary line J1 is longer than the second imaginary line J2 and is at least partially curved.

As described above, according to the present embodiment, an acute angle α between the first imaginary line J1 and the second imaginary line J2 improves aesthetics of the tire 1.

The first imaginary line J1 longer than the second imaginary line J2 improves aesthetics. Since the inner end portions 221 are arranged at intervals so that the first imaginary line J1 is at least partially curved, propagation and growth of cracks are prevented.

Fifth Embodiment

A fifth embodiment will now be described. Herein, identical or substantially similar constituents to those of the above-described embodiments are assigned with the same reference signs, and descriptions thereof are either simplified or omitted.

Figure 14:
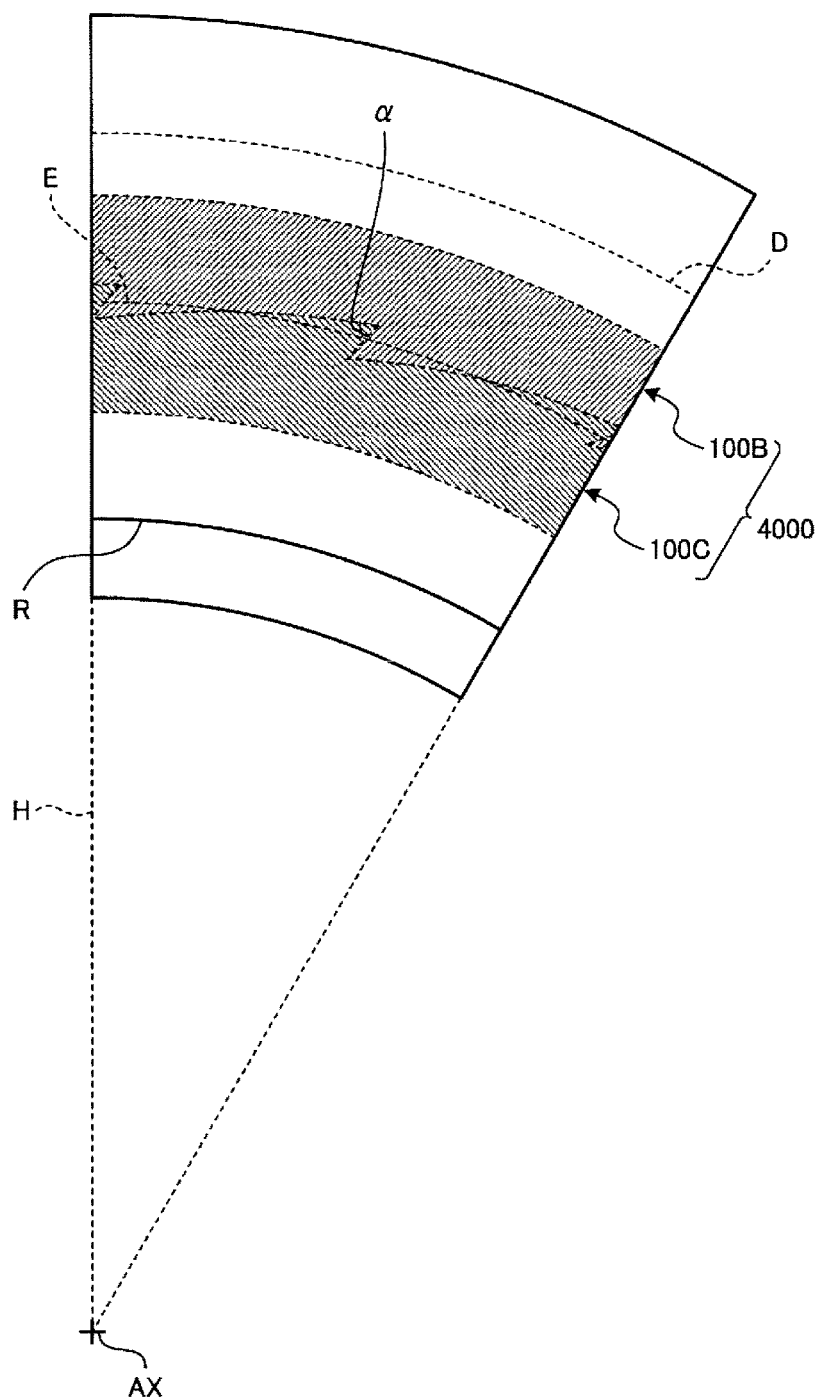
FIG. 14 is a diagram schematically illustrating a portion of a tire according to a fifth embodiment.
Figure 15:
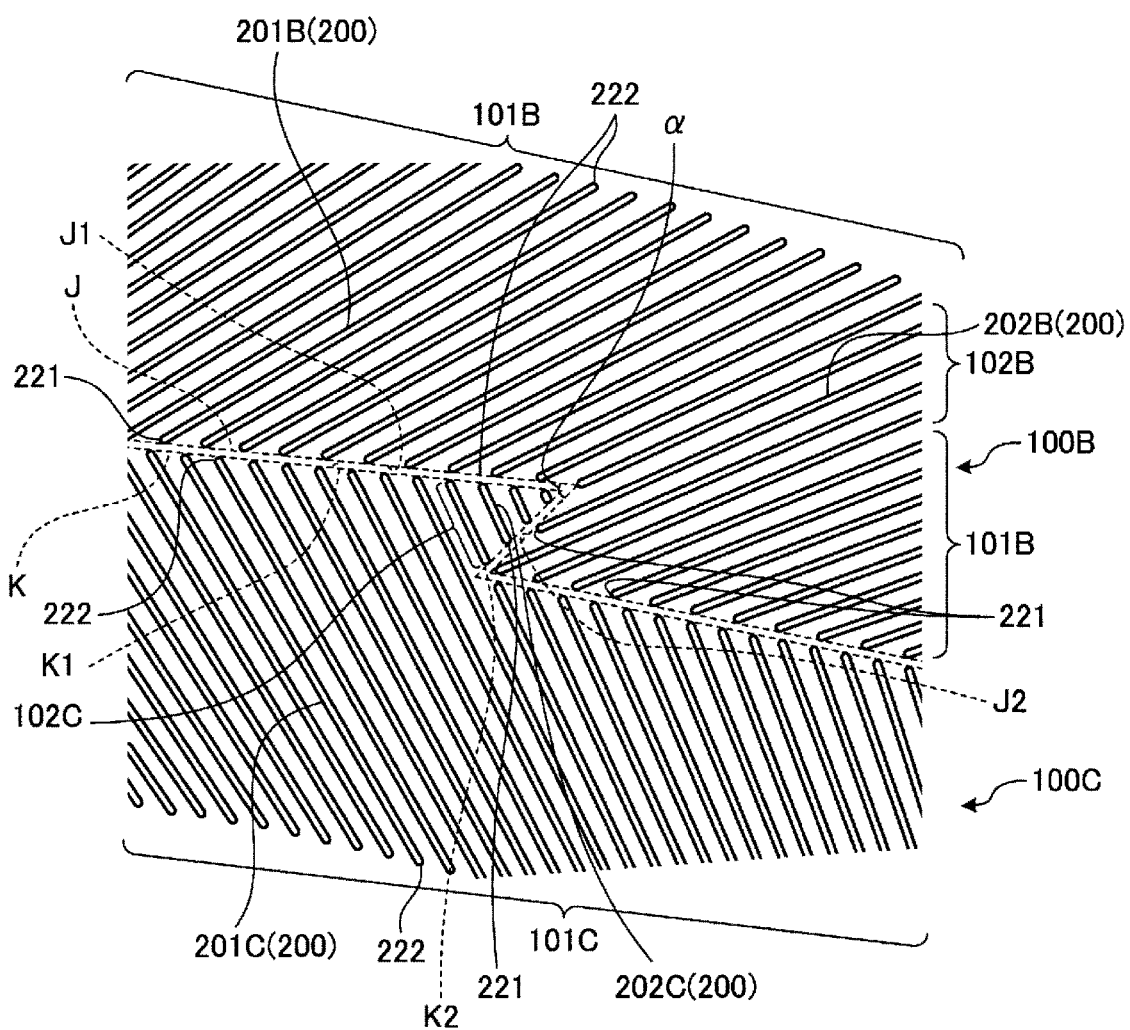
FIG. 15 is a partially enlarged view of FIG. 14.

FIG. 14 is a diagram illustrating an example serration portion 4000 according to the present embodiment. FIG. 15 is a partially enlarged view of FIG. 14. The serration portion 4000 according to the fourth embodiment is configured by adding a serration portion 100C to the inside of the serration portion 100B, described in the fourth embodiment, in the tire radial direction. That is, the serration portion 4000 includes a first serration portion 100B that includes a plurality of inner end portions 221 forming a zigzag inner imaginary line J and a second serration portion 100C that is at least partially disposed inside the first serration portion 100B in the tire radial direction and that includes a plurality of ridges 200 having outer end portions 222 facing the inner end portions 221 of the ridges 200 of the first serration portion 100B.

The angle α between a first imaginary line J1 connecting the inner end portions 221 in each of first ridge groups 101B of the first serration portion 100B and a second imaginary line J2 connecting the inner end portions 221 in each of second ridge groups 102B of the first serration portion 100B is less than 90°.

The ridges 200 of the first serration portion 100B each incline with respect to a radial line H from the rotation axis AX so that the inner end portion 221 is located on the first side of the outer end portion 222 in the tire circumferential direction.

The ridges 200 of the second serration portion 100C each incline with respect to a radial line H from the rotation axis AX so that the outer end portion 222 is located on the first side of the inner end portion 221 in the tire circumferential direction.

The first ridge groups 101B of the first serration portion 100B each include a plurality of first ridges 201B that are arranged adjacent to each other in the tire circumferential direction and that have the inner end portions 221 of which the distances from the rotation axis AX gradually increase from the first side toward the second side in the tire circumferential direction.

The second ridge groups 102B of the first serration portion 100B each include a plurality of second ridges 202B that are arranged adjacent to each other in the tire circumferential direction and that have the inner end portions 221 of which the distances from the rotation axis AX gradually decrease from the first side toward the second side in the tire circumferential direction.

First ridge groups 101C of the second serration portion 100C each include a plurality of first ridges 201C that are arranged adjacent to each other in the tire circumferential direction and that have the outer end portions 222 of which the distances from the rotation axis AX gradually increase from the first side toward the second side in the tire circumferential direction.

Second ridge groups 102C of the second serration portion 100C each include a plurality of second ridges 202C that are arranged adjacent to each other in the tire circumferential direction between the first imaginary line J1 and the second imaginary line J2 and that have the inner end portions 221 of which the distances from the rotation axis AX gradually increase from the first side toward the second side in the tire circumferential direction.

The inner end portions 221 of the first serration portion 100B form the zigzag inner imaginary line J. The outer end portions 222 of the first serration portion 100B form a circular outer imaginary line K.

Third imaginary lines K1 connecting the outer end portions 222 of the first ridges 201C of the second serration portion 100C and fourth imaginary lines K2 connecting the inner end portions 221 of the second ridges 202C of the second serration portion 100C form a zigzag outer imaginary line K. The inner end portions 221 of the second serration portion 100B form a circular inner imaginary line J.

The inner end portions 221 in the first ridge groups 101B of the first serration portion 100B face the outer end portions 222 in the first ridge groups 101C of the second serration portion 100C.

The inner end portions 221 in the second ridge groups 102B of the first serration portion 100B face the inner end portions 221 in the second ridge groups 102C of the second serration portion 100C.

The third imaginary line K1 connecting the outer end portions 222 in each of the first ridge groups 101C of the second serration portion 100C is parallel with the first imaginary line J1. The fourth imaginary line K2 connecting the inner end portions 221 in each of the second ridge groups 102C of the second serration portion 100C is parallel with the second imaginary line J2.

As illustrated in FIG. 15, the ridges 200 of the first serration portion 100B and the ridges 200 of the second serration portion 100C are separated from each other.

Note that the ridges 200 of the first serration portion 100B and the ridges 200 of the second serration portion 100C may be in contact with each other.

As described above, according to the present embodiment, the first imaginary lines J1 and the second imaginary lines J2 form an acute angle, the ridges 200 of the first serration portion 100B each incline with respect to a radial line H from the rotation axis AX so that the inner end portion 221 is located on the first side of the outer end portion 222 in the tire circumferential direction, and the ridges 200 of the second serration portion 100C each incline with respect to a radial line H from the rotation axis AX so that the outer end portion 222 is located on the first side of the inner end portion 221 in the tire circumferential direction. With this configuration, the light reflection direction of the first serration portion 100B and the light reflection direction of the second serration portion 100C are mutually different, enabling consumers to sense visual aesthetics. The inner end portions 221 in the first ridge groups 101B of the first serration portion 100B face the outer end portions 222 in the first ridge groups 101C of the second serration portion 100C, and the first imaginary lines J1 connecting the inner end portions 221 in the first ridge groups 101B of the first serration portion 100B and the third imaginary lines K1 connecting the outer end portions 222 in the first ridge groups 101C of the second serration portion 100C are close to and substantially parallel with each other. The inner end portions 221 in the second ridge groups 102B of the first serration portion 100B face the inner end portions 221 in the second ridge groups 102C of the second serration portion 100C, and the second imaginary lines J2 connecting the inner end portions 221 in the second ridge groups 102C of the first serration portion 100B and the fourth imaginary lines K2 connecting the inner end portions 221 in the second ridge groups 102C of the second serration portion 100C are close to and substantially parallel with each other. This configuration allows the surface of the sidewall portion 7 to be covered with the ridges 200, resulting in prevention of poor appearance, generation of cracks, and growth of cracks.

According to the present embodiment, the second ridge groups 102C of the second serration portion 100C are disposed between the first imaginary lines J1 and the second imaginary lines J2 that form an acute angle. The short ridges 200 of the second ridge groups 102C are disposed between the first imaginary lines J1 and the second imaginary lines J2 that form an acute angle, so that gas accumulation is prevented between the first imaginary lines J1 and the second imaginary lines J2 in a vulcanization step using the mold 500 in manufacturing the tire 1. Gas is smoothly discharged during vulcanization, resulting in manufacture of a high quality tire 1.

Note that in the present embodiment, the second serration portion 100C may be provided, and the first serration portion 100B may be omitted.

Sixth Embodiment

A sixth embodiment will now be described. Herein, identical or substantially similar constituents to those of the above-described embodiments are assigned with the same reference signs, and descriptions thereof are either simplified or omitted.

Figure 16:
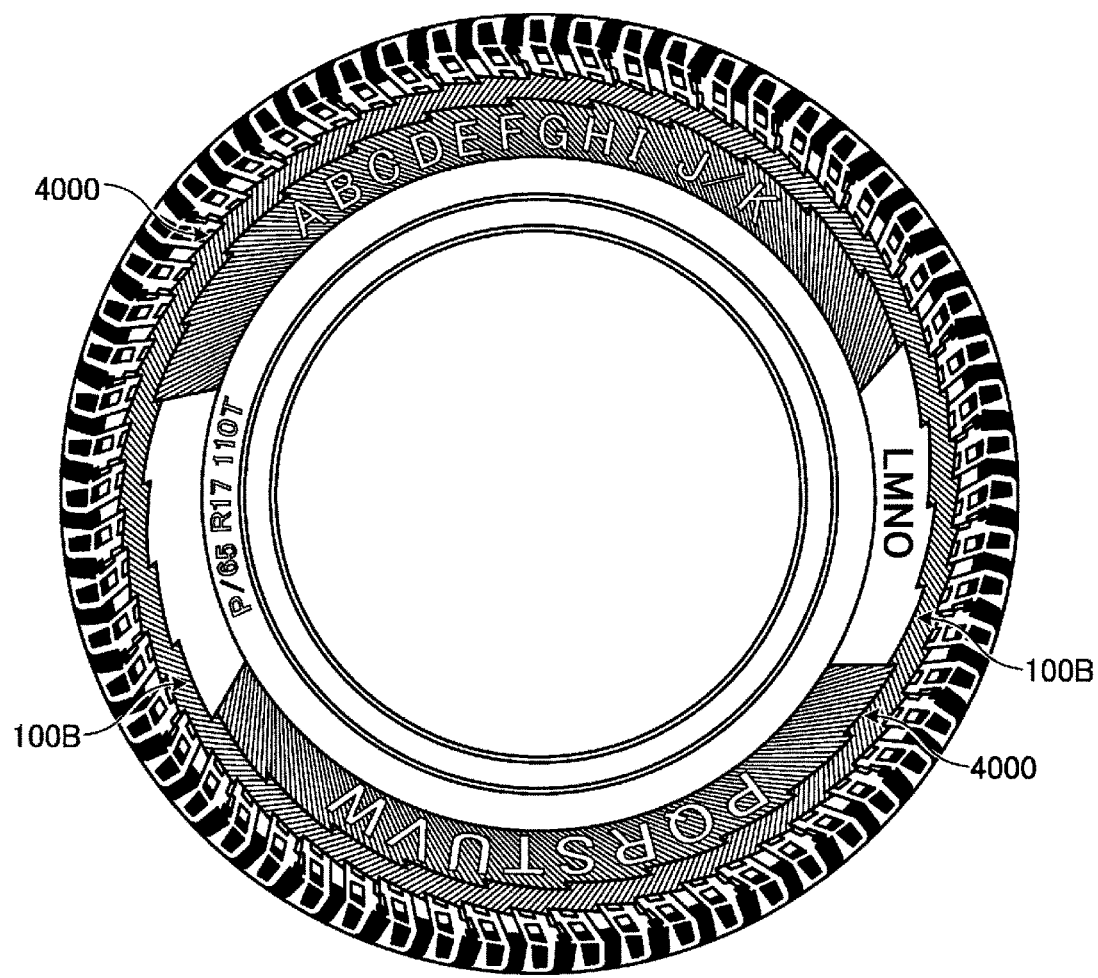
FIG. 16 is a side view of an example of a tire according to a sixth embodiment.

FIG. 16 is a diagram illustrating an example of a tire 1 of the present embodiment. The tire 1 illustrated in FIG. 16 includes the serration portion 100B described in the fourth embodiment and the serration portion 4000 described in the fifth embodiment. The serration portion 100B is disposed on part of the surface of the sidewall portion 7 in the tire circumferential direction. The serration portion 4000 is also disposed on part of the surface of the sidewall portion 7 in the tire circumferential direction. In the example illustrated in FIG. 16, the serration portion 100B and the serration portion 4000 are arranged alternately in the tire circumferential direction. In the serration portion 4000, alphanumerics, such as "ABCDEFGHIJ/K" and "PQRSTUVW", or pattern are provided. On the surface of the sidewall portion 7 inside the serration portion 100B in the tire radial direction, alphanumerics, such as "LMNO", or patterns are provided. The alphanumerics or patterns indicate a brand name or trade name of the tire 1.

According to the present embodiment, the serration portion 100B and the serration portion 4000 have a zigzag imaginary line (boundary), so that the side surface of the tire 1 receives attention in an improved manner, resulting in contribution to brand recognition.

EXAMPLES

Results of evaluation tests performed for the tire 1 according to the present technology will now be described. In the evaluation tests, a pneumatic tire having a tire size of 205/55R16 91V and a rim size of 16×6.5JJ was used.

Figure 17:
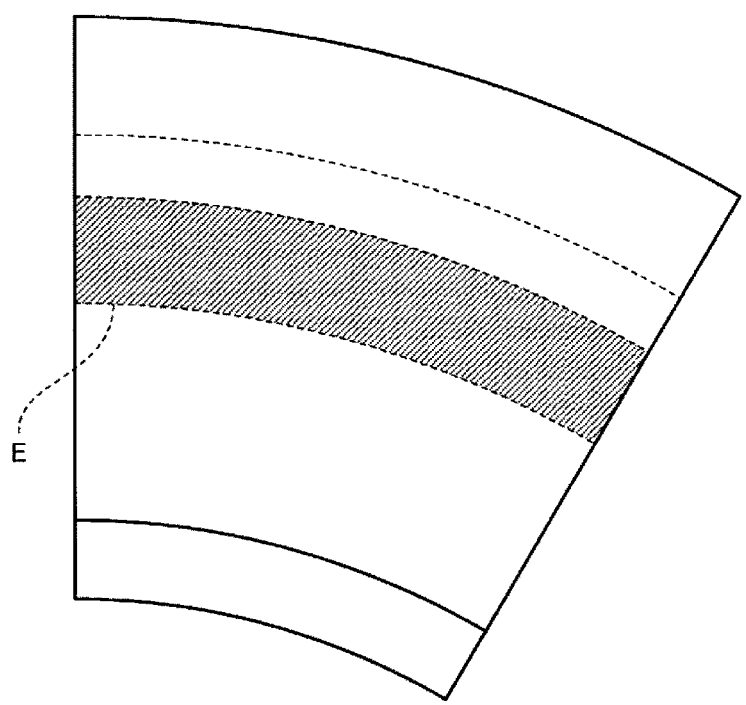
FIG. 17 is a diagram illustrating a tire according to comparative examples used for tire evaluation tests.

Tires according to comparative examples and tires 1 according to the present technology were prepared as tires to be evaluated. A tire according to Comparative Example 1 illustrated in FIG. 17 and a tire according to Comparative Example 2 illustrated in FIG. 18 were prepared as the tires according to the comparative examples. In the tire according to Comparative Example 1, a serration portion was disposed outside the maximum tire width position E in the tire radial direction. In the tire according to Comparative Example 2, a serration portion was disposed both outside and inside the maximum tire width position E in the tire radial direction. In both Comparative Example 1 and Comparative Example 2, the end portions of the ridges were arranged along the maximum tire width position E.

The tire 1 according to the above-described first embodiment (See FIG. 6 and the like), the tire 1 according to the above-described third embodiment (See FIG. 11 and the like), the tire 1 according to the above-described fourth embodiment (See FIG. 13 and the like), and the tire 1 according to the above-described fifth embodiment (See FIG. 14 and the like) were prepared as the tires according to the present technology. Herein, the tire 1 according to the first embodiment (See FIG. 6 and the like) is referred to as tire 1 according to Example 1, the tire 1 according to the third embodiment (See FIG. 11 and the like) as tire 1 according to Example 2, the tire 1 according to the fourth embodiment (See FIG. 13 and the like) as tire 1 according to Example 3, and the tire 1 according to the fifth embodiment (See FIG. 14 and the like) as tire 1 according to Example 4.

Evaluation items of the evaluation tests were (1) durability, (2) appearance, and (3) brand visibility.

Durability indicates a degree of difficulty of generating a crack on the sidewall portions 7 including the maximum tire width positions E. In the evaluation test for durability, cuts having a depth of 1.5 mm and a length of 5.0 mm were formed in recesses between ridges at four locations (at equal intervals) on the periphery of the tire. The tires in which the cuts described above were formed were inflated to an air pressure of 120 kPa, mounted on an indoor drum testing machine, and loaded with a load equivalent to 88% of a maximum load capacity. The tires ran continuously for 62 hours at a speed of 81 km/h. Thereafter, each of the tires was evaluated by measuring a growth ratio of the cuts. The evaluation results were converted to index scores, with the index scores for Comparative Example 1 and Comparative Example 2 being 100. Higher index scores indicate superior durability, and specifically indicate that crack growth is prevented. Note that in these performance tests, pneumatic tires scoring 104 or higher are considered to be superior, and pneumatic tires scoring in a range from 97 to 103 are considered to be equivalent.

Appearance indicates a degree of inconspicuousness of irregularities on the sidewall portions 7 due to the internal structure of the tire. The carcass folded back portions 22 cause irregularities to be formed on the surfaces of the sidewall portions 7. In the evaluation test for appearance, a degree of conspicuousness of the irregularities formed on the surfaces of the sidewall portions 7 due to the carcass folded back portions 22 was evaluated visually. The evaluation results were converted to index scores, with the index scores for Comparative Example 1 and Comparative Example 2 being 100. Higher index scores indicate superior appearance of the sidewall portions 7.

Brand visibility indicates a degree of visibility of alphanumerics or patterns indicating a brand, disposed on the sidewall portions 7 (See FIG. 16). In the evaluation test of brand visibility, a degree of visibility of alphanumerics or patterns indicating a brand, disposed on the sidewall portions 7 was evaluated visually. The evaluation results were converted to index scores, with the index scores for Comparative Example 1 and Comparative Example 2 being 100. Higher index scores indicate superior brand visibility.

Figures 18, 19:
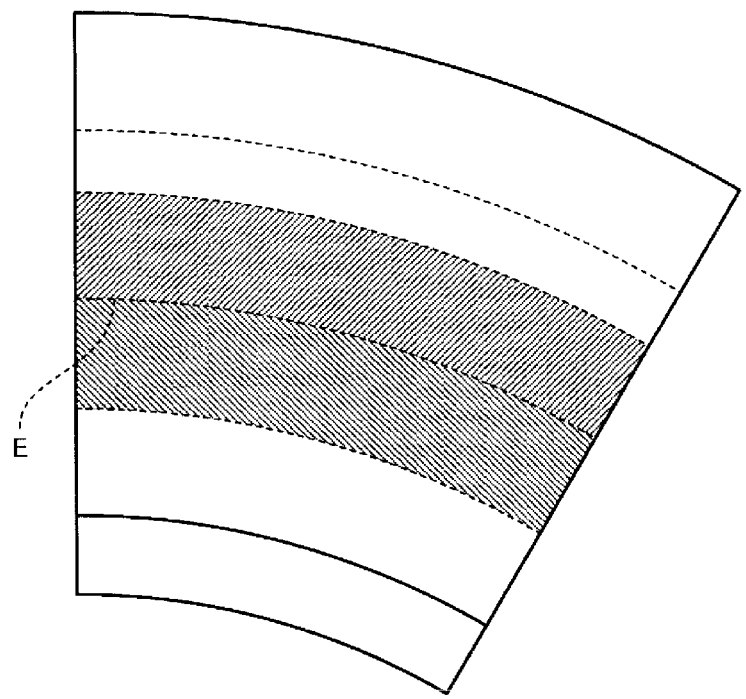
FIG. 18 is a diagram illustrating a tire according to the comparative examples used for the tire evaluation tests.
FIG. 19 is a table showing results of the tire evaluation tests.

FIG. 19 shows results of the evaluation tests for the above-described three evaluation items. As shown in FIG. 19, the examples scored higher in evaluations than the comparative examples concerning all of (1) durability, (2) appearance, and (3) brand visibility. This indicates that the tires 1 according to the present technology have high quality.

The invention claimed is:

1. A pneumatic tire rotatable about a rotation axis upon the pneumatic tire being mounted on a rim, the pneumatic tire comprising:
a tread portion comprising grooves formed into a predetermined pattern design;
a sidewall portion adjacent to a boundary portion of the tread portion in a tire lateral direction and comprising a surface on which a maximum tire width position is located; and
a serration portion comprising a plurality of ridges shaped into lines in a plane orthogonal to the rotation axis, the plurality of ridges each comprising an end portion, and the plurality of ridges being arranged at intervals in a tire circumferential direction on the surface of the sidewall portion;
the serration portion comprising first ridge groups and second ridge groups, the first ridge groups each comprising a plurality of first ridges arranged adjacent to each other in the tire circumferential direction, the plurality of first ridges comprising the end portions of which distances from the rotation axis gradually change, the second ridge groups each comprising a plurality of second ridges arranged adjacent to each other in the tire circumferential direction, and the plurality of second ridges comprising the end portions of which distances from the rotation axis gradually change;
the first ridge groups and the second ridge groups being adjacent to each other in the tire circumferential direction;
the end portion of a first ridge of the plurality of first ridges located farthest on a first side in the tire circumferential direction in each of the first ridge groups being located on one of an inside and an outside of the maximum tire width position in a tire radial direction, and the end portion of a first ridge of the plurality of first ridges located farthest on a second side in the tire circumferential direction being located on the other of the inside and the outside of the maximum tire width position in the tire radial direction; and
the end portion of a second ridge of the plurality of second ridges located farthest on the first side in the tire circumferential direction in each of the second ridge groups being located on one of the inside and the outside of the maximum tire width position in the tire radial direction, and the end portion of a second ridge of the plurality of second ridges located farthest on the second side in the tire circumferential direction being located on the other of the inside and the outside of the maximum tire width position in the tire radial direction;
wherein the end portions of the first ridges on the first and second sides of the maximum tire width position and the end portions of the second ridges on the first and second sides of the maximum tire width position are each discrete and disconnected from any other ridges; and
the end portions of the first ridges and the end portions of the second ridges define an imaginary line arranged in a zigzag manner with the maximum tire width position as a center of amplitude.

2. The pneumatic tire according to claim 1, wherein a plurality of ridge groups each composed of a first ridge group of the first ridge groups and a second ridge group of the second ridge groups are disposed adjacent to each other in the tire circumferential direction.

3. The pneumatic tire according to claim 2, wherein an angle between a first radial line connecting the rotation axis and the end portion located farthest on the first side in the tire circumferential direction in each of the plurality of ridge groups and a second radial line connecting the rotation axis and the end portion located farthest on the second side in the tire circumferential direction is 3° or greater and 30° or less.

4. The pneumatic tire according to claim 2, wherein:
the plurality of ridges are disposed between the boundary portion and a rim check line for checking a state of mounting the pneumatic tire on the rim, on the surface of the sidewall portion; and
a distance, in the tire radial direction, between the end portion located innermost and the end portion located outermost in the tire radial direction is 5% or greater and 40% or less of a distance between the boundary portion and the rim check line in the tire radial direction.

5. The pneumatic tire according to claim 4, wherein an angle between a first imaginary line connecting a plurality of the end portions in each of the first ridge groups and a second imaginary line connecting a plurality of the end portions in each of the second ridge groups is less than 90°.

6. The pneumatic tire according to claim 5, wherein the first imaginary line is longer than the second imaginary line and is at least partially curved.

7. The pneumatic tire according to claim 2, wherein:
the plurality of ridges comprise inner end portions and outer end portions located outside the inner end portions in the tire radial direction;
the end portions of the plurality of ridges are the inner end portions; and
the outer end portions of the plurality of ridges are located outside the maximum tire width position in the tire radial direction.

8. The pneumatic tire according to claim 2, wherein:
the plurality of ridges comprise inner end portions and outer end portions located outside the inner end portions in the tire radial direction; and
the serration portion comprises a first serration portion comprising the inner end portions being the end portions of the plurality of ridges and a second serration portion at least partially disposed inside the first serration portion in the tire radial direction and comprising a plurality of ridges comprising end portions facing the end portions of the plurality of ridges of the first serration portion.

9. The pneumatic tire according to claim 8, wherein:
an angle between a first imaginary line connecting a plurality of the end portions in each of the first ridge groups of the first serration portion and a second imaginary line connecting a plurality of the end portions in each of the second ridge groups of the first serration portion is greater than 90°;
the plurality of ridges of the first serration portion each incline with respect to a radial line from the rotation axis so that the inner end portions are located on the first side of the outer end portions in the tire circumferential direction;
the plurality of ridges of the second serration portion each incline with respect to a radial line from the rotation axis so that the outer end portions are located on the first side of the inner end portions in the tire circumferential direction;
the first ridge groups of the first serration portion each comprise a plurality of first ridges arranged adjacent to each other in the tire circumferential direction and comprising the inner end portions of which distances from the rotation axis gradually increase;
the second ridge groups of the first serration portion each comprise a plurality of second ridges arranged adjacent to each other in the tire circumferential direction and comprising the inner end portions of which distances from the rotation axis gradually decrease;
the first ridge groups of the second serration portion each comprise a plurality of first ridges arranged adjacent to each other in the tire circumferential direction and comprising the outer end portions of which distances from the rotation axis gradually increase;
the second ridge groups of the second serration portion each comprise a plurality of second ridges arranged adjacent to each other in the tire circumferential direction and comprising the outer end portions of which distances from the rotation axis gradually decrease;
the end portions of the first serration portion are the inner end portions;
the end portions of the second serration portion are the outer end portions;
the inner end portions in the first ridge groups of the first serration portion face the outer end portions in the first ridge groups of the second serration portion; and the inner end portions in the second ridge groups of the first serration portion face the outer end portions in the second ridge groups of the second serration portion.

10. The pneumatic tire according to claim 8, wherein:
an angle between a first imaginary line connecting a plurality of the end portions in each of the first ridge groups of the first serration portion and a second imaginary line connecting a plurality of the end portions in each of the second ridge groups of the first serration portion is less than 90°;
the plurality of ridges of the first serration portion each incline with respect to a radial line from the rotation axis so that the inner end portions are located on the first side of the outer end portions in the tire circumferential direction;
the plurality of ridges of the second serration portion each incline with respect to a radial line from the rotation axis so that the outer end portions are located on the first side of the inner end portions in the tire circumferential direction;
the first ridge groups of the first serration portion each comprise a plurality of first ridges arranged adjacent to each other in the tire circumferential direction and comprising the inner end portions of which distances from the rotation axis gradually increase;
the second ridge groups of the first serration portion each comprise a plurality of second ridges arranged adjacent to each other in the tire circumferential direction and comprising the inner end portions of which distances from the rotation axis gradually increase;
the first ridge groups of the second serration portion each comprise a plurality of first ridges arranged adjacent to each other in the tire circumferential direction and comprising the outer end portions of which distances from the rotation axis gradually increase;
the second ridge groups of the second serration portion each comprise a plurality of second ridges arranged adjacent to each other in the tire circumferential direction between the first imaginary line and the second imaginary line and comprising the inner end portions of which distances from the rotation axis gradually increase;
the end portions of the first serration portion are the inner end portions;
the end portions of the first ridges of the second serration portion are the outer end portions;
the end portions of the second ridges of the second serration portion are the inner end portions;
the inner end portions in the first ridge groups of the first serration portion face the outer end portions in the first ridge groups of the second serration portion; and
the inner end portions in the second ridge groups of the first serration portion face the inner end portions in the second ridge groups of the second serration portion.

11. The pneumatic tire according to claim 1, wherein:
the plurality of ridges are disposed between the boundary portion and a rim check line for checking a state of mounting the pneumatic tire on the rim, on the surface of the sidewall portion; and
a distance, in the tire radial direction, between the end portion located innermost and the end portion located outermost in the tire radial direction is 5% or greater and 40% or less of a distance between the boundary portion and the rim check line in the tire radial direction.

12. The pneumatic tire according to claim 1, wherein an angle between a first imaginary line connecting a plurality of the end portions in each of the first ridge groups and a second imaginary line connecting a plurality of the end portions in each of the second ridge groups is less than 90°.

13. The pneumatic tire according to claim 12, wherein the first imaginary line is longer than the second imaginary line and is at least partially curved.

14. The pneumatic tire according to claim 1, wherein:
the plurality of ridges comprise inner end portions and outer end portions located outside the inner end portions in the tire radial direction;
the end portions of the plurality of ridges are the inner end portions; and
the outer end portions of the plurality of ridges are located outside the maximum tire width position in the tire radial direction.

15. The pneumatic tire according to claim 1, wherein:
the plurality of ridges comprise inner end portions and outer end portions located outside the inner end portions in the tire radial direction; and
the serration portion comprises a first serration portion comprising the inner end portions being the end portions of the plurality of ridges and a second serration portion at least partially disposed inside the first serration portion in the tire radial direction and comprising a plurality of ridges comprising end portions facing the end portions of the plurality of ridges of the first serration portion.

16. The pneumatic tire according to claim 15, wherein:
an angle between a first imaginary line connecting a plurality of the end portions in each of the first ridge groups of the first serration portion and a second imaginary line connecting a plurality of the end portions in each of the second ridge groups of the first serration portion is greater than 90°;
the plurality of ridges of the first serration portion each incline with respect to a radial line from the rotation axis so that the inner end portions are located on the first side of the outer end portions in the tire circumferential direction;
the plurality of ridges of the second serration portion each incline with respect to a radial line from the rotation axis so that the outer end portions are located on the first side of the inner end portions in the tire circumferential direction;
the first ridge groups of the first serration portion each comprise a plurality of first ridges arranged adjacent to each other in the tire circumferential direction and comprising the inner end portions of which distances from the rotation axis gradually increase;
the second ridge groups of the first serration portion each comprise a plurality of second ridges arranged adjacent to each other in the tire circumferential direction and comprising the inner end portions of which distances from the rotation axis gradually decrease;
the first ridge groups of the second serration portion each comprise a plurality of first ridges arranged adjacent to each other in the tire circumferential direction and comprising the outer end portions of which distances from the rotation axis gradually increase;
the second ridge groups of the second serration portion each comprise a plurality of second ridges arranged adjacent to each other in the tire circumferential direction and comprising the outer end portions of which distances from the rotation axis gradually decrease;
the end portions of the first serration portion are the inner end portions;

the end portions of the second serration portion are the outer end portions;

the inner end portions in the first ridge groups of the first serration portion face the outer end portions in the first ridge groups of the second serration portion; and the inner end portions in the second ridge groups of the first serration portion face the outer end portions in the second ridge groups of the second serration portion.

17. The pneumatic tire according to claim 15, wherein:

an angle between a first imaginary line connecting a plurality of the end portions in each of the first ridge groups of the first serration portion and a second imaginary line connecting a plurality of the end portions in each of the second ridge groups of the first serration portion is less than 90°;

the plurality of ridges of the first serration portion each incline with respect to a radial line from the rotation axis so that the inner end portions are located on the first side of the outer end portions in the tire circumferential direction;

the plurality of ridges of the second serration portion each incline with respect to a radial line from the rotation axis so that the outer end portions are located on the first side of the inner end portions in the tire circumferential direction;

the first ridge groups of the first serration portion each comprise a plurality of first ridges arranged adjacent to each other in the tire circumferential direction and comprising the inner end portions of which distances from the rotation axis gradually increase;

the second ridge groups of the first serration portion each comprise a plurality of second ridges arranged adjacent to each other in the tire circumferential direction and comprising the inner end portions of which distances from the rotation axis gradually increase;

the first ridge groups of the second serration portion each comprise a plurality of first ridges arranged adjacent to each other in the tire circumferential direction and comprising the outer end portions of which distances from the rotation axis gradually increase;

the second ridge groups of the second serration portion each comprise a plurality of second ridges arranged adjacent to each other in the tire circumferential direction between the first imaginary line and the second imaginary line and comprising the inner end portions of which distances from the rotation axis gradually increase;

the end portions of the first serration portion are the inner end portions;

the end portions of the first ridges of the second serration portion are the outer end portions;

the end portions of the second ridges of the second serration portion are the inner end portions;

the inner end portions in the first ridge groups of the first serration portion face the outer end portions in the first ridge groups of the second serration portion; and the inner end portions in the second ridge groups of the first serration portion face the inner end portions in the second ridge groups of the second serration portion.

* * * * *